United States Patent [19]

Schrenk et al.

[11] Patent Number: 5,540,878
[45] Date of Patent: Jul. 30, 1996

[54] METHOD FOR PRODUCING BLOW MOLDED MULTILAYER PLASTIC ARTICLES

[75] Inventors: Walter J. Schrenk; Ranganath K. Shastri, both of Midland; Herbert C. Roehrs, Beaverton; Ralph E. Ayres, Midland, all of Mich.

[73] Assignee: The Dow Chemical Company, Midland, Mich.

[21] Appl. No.: 313,669

[22] Filed: Sep. 27, 1994

Related U.S. Application Data

[60] Continuation of Ser. No. 956,798, Oct. 5, 1992, abandoned, which is a division of Ser. No. 684,467, Apr. 11, 1991, Pat. No. 5,202,074, which is a continuation of Ser. No. 456,718, Dec. 26, 1989, abandoned.

[51] Int. Cl.$^6$ ............................................. B29C 49/22
[52] U.S. Cl. ........................... 264/513; 264/512; 425/523
[58] Field of Search ........................... 264/73, 75, 241, 264/245, 297.2, 328.8, 328.12, 513, 255, 512; 425/130, 132, 133.1, 133.5, 523, 533, 588

[56] References Cited

U.S. PATENT DOCUMENTS

| | | | |
|---|---|---|---|
| 3,195,865 | 7/1965 | Harder | 259/4 |
| 3,239,197 | 3/1966 | Tollar | 259/4 |
| 3,404,869 | 10/1968 | Harder | 264/241 |
| 3,557,265 | 1/1971 | Chisholm et al. | 264/47 |
| 3,565,985 | 2/1971 | Schrenk et al. | 264/171 |
| 3,716,612 | 2/1973 | Schrenk et al. | 264/241 |
| 3,736,201 | 5/1973 | Teraoka | 264/540 |
| 3,817,675 | 6/1974 | Maiocco | 425/130 |
| 3,884,606 | 5/1975 | Schrenk | 425/133.5 |
| 4,152,104 | 5/1979 | Przytulla et al. | 425/133.1 |
| 4,174,413 | 11/1979 | Yasuike et al. | 215/1 C |
| 4,410,482 | 10/1983 | Subramanian | 264/515 |
| 4,416,942 | 11/1983 | DiLuccio | 264/515 |
| 4,444,317 | 4/1984 | Subramanian | 264/171 |
| 4,449,913 | 5/1984 | Krishnakumar et al. | 264/328.8 |
| 4,501,781 | 2/1985 | Kushida et al. | 215/1 C |
| 4,511,528 | 4/1985 | Kudert et al. | 264/328.8 |
| 4,525,134 | 6/1985 | McHenry et al. | 264/513 |
| 4,535,901 | 8/1985 | Okudaira et al. | 215/1 C |
| 4,775,308 | 10/1988 | Schad et al. | 425/130 |
| 4,892,699 | 1/1990 | Kudert et al. | 264/328.8 |
| 4,978,290 | 12/1990 | Fukuhara | 425/133.1 |
| 5,004,578 | 4/1991 | Eiselen | 264/515 |
| 5,143,681 | 9/1992 | Daubenbuchel et al. | 264/515 |

FOREIGN PATENT DOCUMENTS

| | | | |
|---|---|---|---|
| 278403-A2 | 8/1988 | European Pat. Off. | |
| 45-39190 | 12/1970 | Japan | 264/513 |
| 84-049896 | 12/1978 | Japan | 264/513 |
| 59-091042 | 5/1984 | Japan | 264/328.8 |
| 61-108521 | 5/1986 | Japan | 425/130 |
| 354837 | 8/1931 | United Kingdom | 425/132 |

OTHER PUBLICATIONS

James R. Dreps, Design Blow Molds with an Eye to Economy—part 2 Plastics Engineering, Fed. 1975, pp. 32–35.
ASME Publication Paper No. 62–WA–336 Schrenk, Cleereman, Alfrey, Jr.
Smoluk, Modern Plastics, Apr. 1989 pp. 67, 69.
Package Manufacturing, Package Digest, Jan. 1977.
Pawloski and Raspor, Articles with Improved Properties via Solid Phase Forming, ANTEC '85, 1985.

*Primary Examiner*—Catherine Timm

[57] ABSTRACT

A blow molded multilayer plastic article having a large number of layers is formed. First and second diverse thermoplastic streams are extruded into a coextrusion feedblock. In the feedblock the streams are divided into multiple streams and arranged into a first composite stream having a substantially uniform distribution of the layers. The first stream is fed into an interfacial surface generator in which the stream is manipulated to form a second composite stream having even more layers of substantially uniform thickness. This second stream is then formed into a preform such as by injection molding and this preform is blow molded. The second composite stream and preform are formed so that the layers of first and second materials lie generally parallel to a critical surface and possess substantial uniformity when blow molded.

9 Claims, 10 Drawing Sheets

WITH ROSS STATIC
MIXER ELEMENTS
WITH THE ISG's
OF FIGURES 2 AND 3
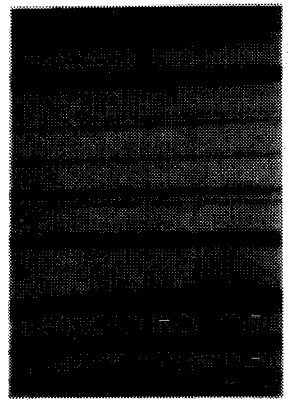
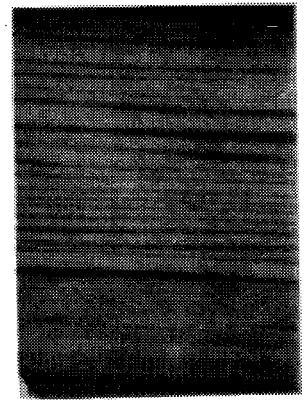
A. NEAR THE LIP
OF THE CONTAINER
FIG.4A
FIG.4B
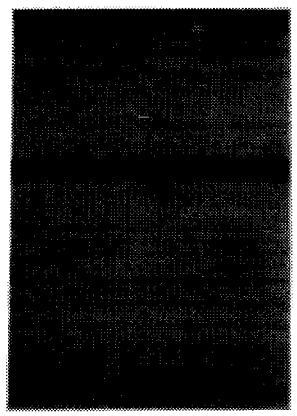
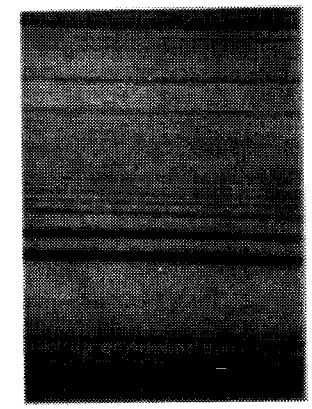
B. AT THE MIDDLE
FIG.4C
FIG.4D
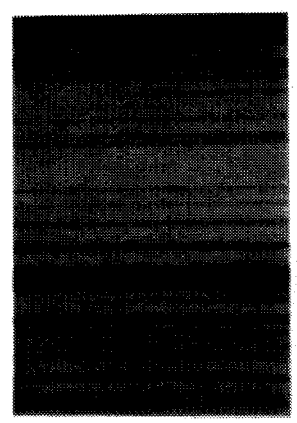
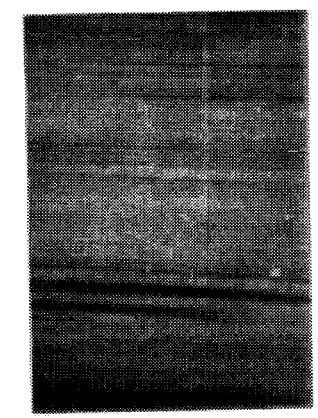
C. NEAR THE
BOTTOM
FIG.4E
FIG.4F

WITHOUT SYMMETRICIZER

WITH SYMMETRICIZER

*WITHOUT SYMMETRICIZER*

*WITH SYMMETRICIZER*

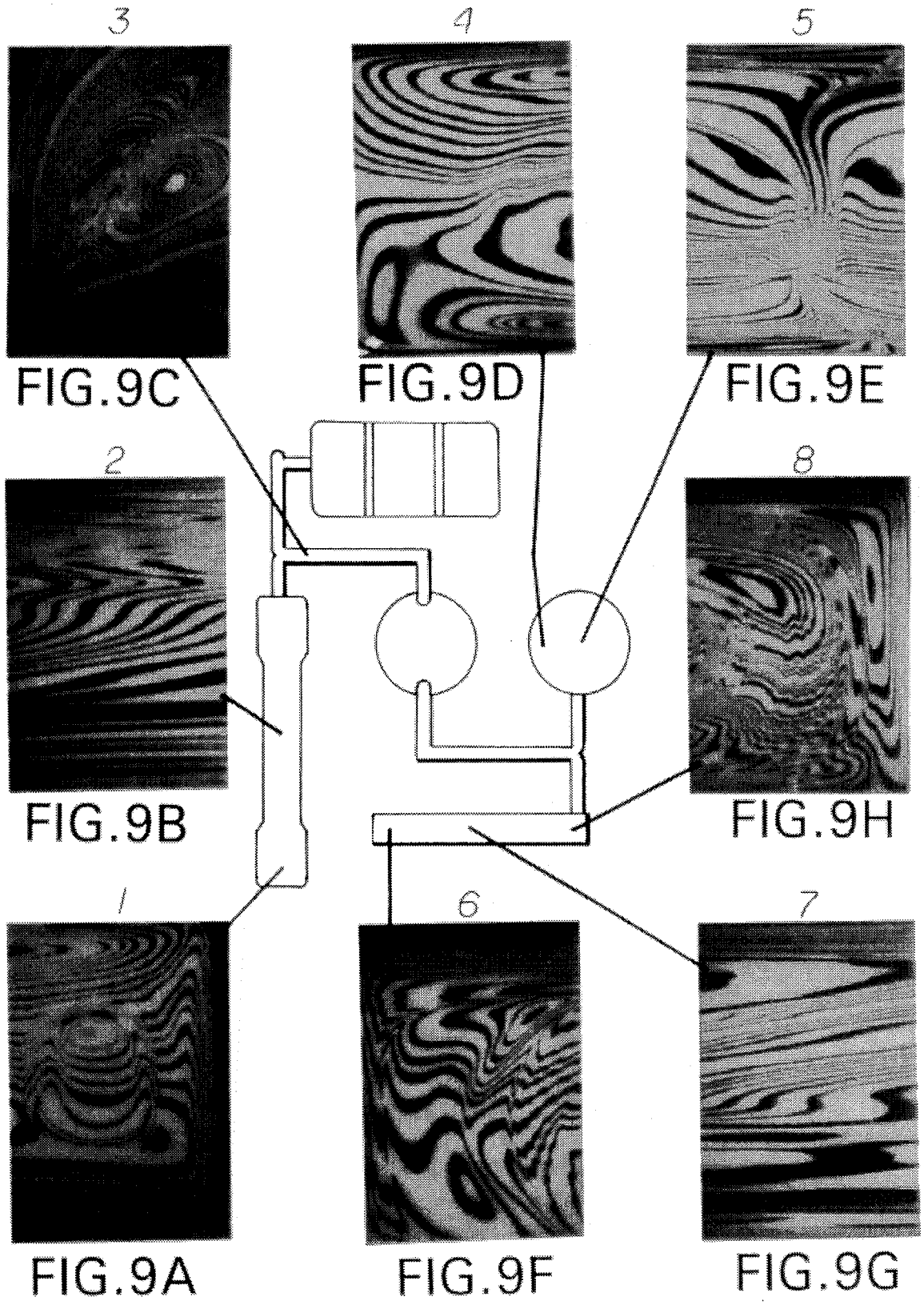

METHOD FOR PRODUCING BLOW MOLDED MULTILAYER PLASTIC ARTICLES

This is a continuation in of U.S. application Ser. No. 07/956,798, filed Oct. 5, 1992, now abandoned, which is a divisional of U.S. application Ser. No. 07/684,467, filed Apr. 11, 1991, now U.S. Pat. No. 5,202,074, which is a continuation of application Ser. No. 07/456,718, filed Dec. 26, 1989, now abandoned.

BACKGROUND OF THE INVENTION

1. Field of the Invention

The present invention relates to multilayer plastic articles displaying certain desirable qualities, and more particularly to methods and apparatus for producing such articles.

2. Description of the Prior Art

Injection molding is a preferred fabrication method for a variety of plastic articles, and possesses a number of well known advantages over common alternative methods of fabrication. Chief among these advantages is the reduced amount of scrap which must be disposed of or recycled, and the relative speed with which plastic articles can be made compared to the aforementioned alternative methods of fabrication. Injection molding has been found particularly suitable for making precision parts of complex geometry at relatively high production rates.

It has been appreciated that articles formed by injection molding or by other forming processes and comprising overlapping layers of diverse thermoplastic resinous materials could realize a combination of properties which could not be realized otherwise, except perhaps by the synthesis of an entirely new material or the use of a prohibitively expensive existing material. Because of its popularity and its advantages over alternative methods of fabrication, the injection molding process has been adapted to polymer-polymer multiphase composites generally, and more specifically to the production of multilayer plastic articles.

Where a lamellar construction is desirable, an idealized construction of an injection-moldable article would have the article comprised of something like a coextruded sheet of materials which has been wrapped around the walls or exterior surfaces and through the angles of the article. Heretofore, however, it has not been possible to produce multilayer plastic articles by the simple injection molding of a single stream of diverse thermoplastic resinous materials wherein an article displays in its construction something of the character of a coextruded sheet of such materials with respect to significant portions of the article.

Specifically, it has not been possible to injection mold such a stream into an article which possesses a substantial uniformity of composition adjacent a critical surface of the article, or wherein overlapping layers of the diverse thermoplastic resinous materials incorporated in the article have been effectively controlled in terms of their orientation and relationship with such a surface of the article, have been made substantially continuous adjacent a critical surface of the article, or have retained a selected layer order with respect to layers of diverse thermoplastic resinous materials while demonstrating one or more of the other characteristics mentioned.

Parenthetically, a "critical surface" for purposes of the present disclosure should be taken to refer to a surface of the article which will be subject to various stresses or wherein the properties which are sought to be enhanced by a lamellar construction will be desired. Where the object of employing the methods and apparatus of the present invention, whether with regard to multilayer articles of a particular shape or form or with regard to the particular process of injection molding, is to enhance barrier properties with respect to a particular gas or solvent, for example, a critical surface would correspond to any surface which is expected to contact that gas or solvent and to form a barrier to permeation of the gas or solvent therethrough.

Nor has it been previously possible to injection mold articles wherein one or more of the foregoing qualities are found and further, the layers are of such a thickness that a thousand layers may span but 15 microns. It has also not been considered that these qualities could fairly be achieved in multicavity injection molding using but a single stream of diverse materials or indeed, that multilayer articles showing substantially co-continuous lamellae in any selected cross-section of the articles could be produced by such multicavity injection molding, especially where one of the diverse materials is present in comparatively minor amounts.

Because of the inability to produce multilayer plastic articles having one or more of the above characteristics by a simple injection molding process, a great deal of effort and expense has been devoted to developing blends of diverse thermoplastic resinous materials which would approximate the benefits to be derived from a lamellar morphology, without the necessity of synthesizing an entirely new material or using a prohibitively expensive existing material.

Such blends are useful with standard injection molding apparatus, but possess a number of disadvantages. For example, when the blend is comprised of two or more resins which are at least partially incompatible, the morphology of a resin which is present as a minor component in the blend, as may likely be true where the particular resin is expensive, is thermodynamically driven toward the fibrillar or spherical regimes.

Where the property sought to be produced by the presence of the minor component is an improved barrier to gas or solvent permeation through the wall of an article comprised of the blend, this fibrillar or spherical morphology does not permit an effective barrier to be formed unless a substantial amount of barrier resin is added. Where the barrier resin is among the more expensive components of blend, the addition of an amount of sufficient barrier resin to create an effective barrier and to approach a lamellar morphology in the blend can defeat the very purpose of employing a blend of otherwise relatively inexpensive components, namely the avoidance of the expense of developing a newly synthesized material or using a more expensive existing material.

Moreover, the adhesives or compatibilizing materials which must be added generally to achieve a cohesive, unitary article comprised of such incompatible resins must find their way to an interface between the incompatible resins through a complicated flow field. Some portion of the adhesive used will not find an interface and will not accomplish its purpose, resulting in a deficiency in some properties of the article and needless materials expense.

Efforts have also been made to produce multilayer articles of a sort by a co-injection molding process, as shown for example in U.S. Pat. No. 4,525,134 to McHenry et al.

Because of the complexities involved in such co-injection processes for making multilayer articles, however, and in view of the limitations and disadvantages attendant to such complexities in terms of process control, ease of operation, adaptability to various polymer systems and applications such as multicavity injection molding with cavities having varying or anything but the simplest geometries, etc., some efforts at injection molding a single stream of diverse materials have also been made and are evidenced in the art.

U.S. Pat. No. 3,716,612 to Schrenk et al., for example, discloses a method and apparatus for making a plastic article comprised of an apparent plurality of thin and distinct layers of diverse synthetic resinous materials.

The apparatus and method of the referenced Schrenk et al. patent, it has been discovered, initially create a thickness gradient in layers of the various polymeric materials to be formed into an article, and a gradient is perpetuated within the walls of the multilayer plastic article formed by such apparatus and method. Layers which are formed near a rotating wall of the annular configuration tend to become vanishingly thin and discontinuous due to the shearing movement of the wall, while other layers are comparatively thick, so that a not insubstantial portion of the layers in a cross-section of a wall of a multilayer article can become discontinuous before a desired attenuation in the thickness of other layers and parts of layers is achieved. Some corresponding loss of properties may be expected at the layers located near a rotating wall.

European Patent Application 0278403 to Mitsubishi Gas Chemical Company, Inc., represents still another effort at achieving the benefits of a lamellar construction by some sort of manageable injection molding process. The Mitsubishi patent application describes two methods of producing a parison and blow molded container containing a barrier resin. The first method involves the random generation of a multilayer stream of two polymers such as polyethylene terephthalate (PET) and "MX nylon" (a meta-xylene group-containing polyamide) by passing the polymers through a static mixing device. The second method achieves similar results in terms of the desired properties of the articles by merely a coarse mixing of the same polymers. The main benefit realized by these methods is a reduction in haze compared to a uniformly mixed blend of the polymers, while maintaining or realizing a modest improvement in barrier properties and adhesion.

U.S. Pat. No. 4,410,482 to Subramanian discloses a process for manufacturing laminar articles purporting to have improved barrier properties apart from an injection molding context. Particles of a limited range of sizes of a polyolefin and a condensation polymer are gently mixed under controlled heating conditions, with a compatibilizing resin being mixed in as individual particles also or having been previously coated onto particles of the polyolefin or condensation polymer prior to mixing. The melt is then stretched as by extrusion blow molding to form a multitude of thin, substantially two dimensional, parallel and overlapping layers, and is cooled.

With regard to other processes for making multilayer plastic articles, U.S. Pat. No. 4,416,942 to Diluccio discloses the coextrusion blow molding of a laminate, the first layer of which is to consist of a lamellar, heterogeneous blend of the type disclosed in U.S. Pat. No. 4,410,482 and described above, and the second layer of which is a polyolefin which comprises 10 to 90 percent of the thickness of the laminate.

Generally speaking, it would be desirable to develop methods and apparatus for producing multilayer plastic articles wherein the articles demonstrate a substantial uniformity of composition adjacent a critical surface thereof at least with respect to layers of those materials whose properties are enhanced by a lamellar construction, wherein layers are discrete and substantially continuous, or wherein a selected layer order is preserved along with one or more of the other characteristics just mentioned after the forming of a layered composite stream into an article. It would be particularly desirable to develop such methods and apparatus which further utilize injection molding techniques and apparatus.

It is an object, then, of the present invention to provide a method and apparatus for making multilayer plastic articles utilizing injection molding techniques and apparatus.

It is also an object of the present invention to provide a method and apparatus which will produce multilayer articles wherein the layers exhibit one or more of the qualities of: a substantial uniformity of composition adjacent a critical surface of the article; the retention of discrete and substantially continuous layers adjacent such a critical surface; and, the retention of a selected layer order, after injection molding, injection blow molding, compression molding, transfer molding, displacement blow molding or extrusion blow molding into a desired configuration a single layered stream of diverse thermoplastic resinous materials, with one or more of the above qualities also being present.

It is a further object of the present invention to provide a method and apparatus for producing multilayer plastic articles which display one or more of the qualities just mentioned, preferably by using injection molding and injection molding apparatus, without the need for rigid, complex and expensive process controls.

Still other objects and advantages will become apparent upon reading the description which follows in conjunction with the accompanying drawings.

SUMMARY OF THE INVENTION

The present invention overcomes the shortcomings of the prior arty and attains the aforementioned and other objects and advantages by providing novel and improved methods and apparatus for making multilayer plastic articles.

The moldable articles produced by the methods and apparatus of the present invention comprise discrete and substantially continuous layers of a plurality of diverse thermoplastic resinous materials. Normally, the articles will contain at least about 17 such layers, and typically can contain in excess of about one hundred such layers. These layers are preferably substantially evenly distributed across a cross-section of the article adjacent a critical surface thereof, at least with respect to those materials which in lamellar form impart the properties which are desired to the articles, and may further display one or more of the other beneficial qualities enumerated above.

The novel methods and apparatus which we have developed to make these multilayer articles involve the provision of two or more streams of diverse thermoplastic materials. Layers are formed from these streams and arranged in a layered first composite stream in a non-random fashion, as for example by a particular coextrusion feedblock apparatus, in layers of a uniformity, continuity, and thickness specifically calculated to provide a desired configuration having the desired properties on injection, compression, or transfer molding, injection blow molding, extrusion blow molding, or displacement blow molding. In one embodiment, we have found that it is possible to thereafter directly form the first composite stream into a desired configuration by one of the listed processes while achieving one or more of the desired characteristics in the desired configuration.

In an alternate embodiment of our invention, we have found that the first composite stream could be manipulated to form a second composite stream having an increased number of layers of the property-affecting materials of interest, and that this second composite stream could thereafter be formed into a desired configuration with the same beneficial qualities.

We have discovered, for example, that the objects of the present invention can be achieved by the use of the above-mentioned coextrusion feedblock apparatus to create a first composite stream of a uniform character with respect to layers of property-affecting materials, and in large part by the further selection and use of such appropriate interfacial surface generators as will be described subsequently. Such interfacial surface generators principally are selected to manipulate the first composite stream thus created and thereby form a second composite stream having more layers of the materials of interest than the first composite stream, without causing such distortions of the layers comprising the first composite stream as would prevent the retention of the coextruded character of the first composite stream on completion of the injection, transfer, or compression molding, extrusion blow molding, displacement blow molding or injection blow molding step.

In a particularized application of the present invention, a compatibilizing material may be supplied as an additional material, and layers of this compatibilizing material may be advantageously and non-randomly placed in a selected layer order between any otherwise adjacent layers of incompatible or at least partially incompatible materials. The apparatus and methods provided herein enable the retention of this selected layer order, with the concurrent achievement of one or more of the beneficial characteristics mentioned above with respect to layer continuity and uniformity of composition, through the molding of a first composite stream into a desired configuration or through the formation of a second composite stream and its subsequent molding by one of the various forming processes listed above.

A more detailed explanation of the principles underlying our invention, and of the manner in which the apparatus and methods set forth below accomplish the present invention, need not be undertaken herein. These and additional aspects and advantages of the methods and apparatus of the present invention, and of the articles which are made possible thereby, will however become apparent upon reading the detailed description which follows in conjunction with the accompanying drawings.

BRIEF DESCRIPTION OF THE DRAWINGS

FIG. 4 photomicrographically illustrates the extent of uniformity of layer thicknesses and evenness of distribution which may be achieved by the apparatus of FIG. 3.

FIG. 9 presents the series of micrographs whose location is noted in FIG. 8.

FIG. 1, is a set of cross-sectional photomicrographs of an article of the present invention constructed as set forth in Example 2 below.

DETAILED DESCRIPTION OF THE PREFERRED EMBODIMENTS

Figure 1:
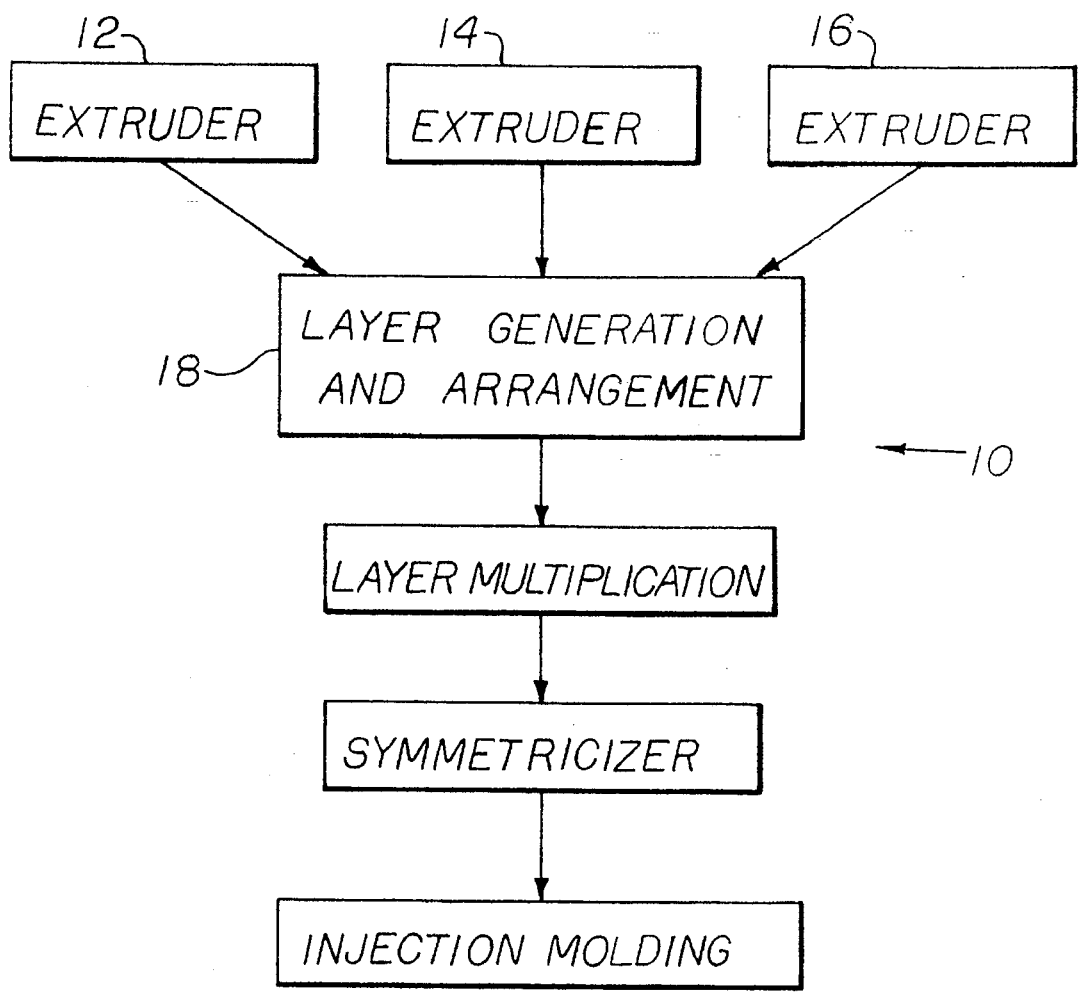
FIG. 1 is a schematic of an apparatus of the present invention for injection molding multilayer plastic articles.

Referring now to FIGS. 1–11, and more particularly to FIG. 1, a preferred apparatus 10 of the present invention is schematically illustrated. Extruders 12, 14 and 16 of FIG. 1 are sources of first, second and third diverse heat plastified thermoplastic materials, respectively, although other sources of such materials may be suitably employed as well. It should also be noted that the depiction of only three extruders as in FIG. 1 does not negate the presence and use of perhaps additional or even fewer extruders or sources of thermoplastic materials, where other or fewer materials are sought to be incorporated into layers of a multilayer article to be formed. Additional materials and layers of materials may be required, for example, where two materials, or two materials joined by a third compatibilizing material cannot by themselves impart the desired improvement in properties to the articles to be formed.

It should be noted parenthetically that the term "diverse", when used above and as used hereafter in describing the constituent materials of articles made according to the present invention and through the apparatus and/or methods of the present invention, suggests only some measurable distinction between such "diverse" materials. This distinction may be of a chemical nature, a physical nature, or in the nature of a difference in color, appearance or optical effect. It is not necessary that one material be, for example, polyethylene while a second, "diverse" material is polypropylene. Nor is it necessary that the materials themselves comprise but a single identifiable species, so that a mixture of polyethylene and polypropylene could comprise a "thermoplastic resinous material" for purposes of this invention, and would be diverse from polyethylene or polypropylene individually.

Means for generating and controllably or non-randomly arranging layers of the first, second and third materials in a first composite stream is schematically depicted in FIG. 1 and comprises in the preferred embodiment a coextrusion feedblock apparatus 18. A preferred coextrusion feedblock apparatus for generating and arranging layers of the first, second and third materials in a first composite stream is as disclosed in U.S. Pat. No. 3,557,265 to Chisholm et al. or as disclosed in U.S. Pat. No. 3,884,606 to Schrenk et al., the disclosures of these commonly-assigned references being hereby incorporated herein by reference.

Generally speaking, and without reference to any particular illustration of those patents, the coextrusion feedblock apparatus of U.S. Pat. Nos. 3,557,265 and 3,884,606 comprise a housing having at least a first inlet and a second inlet for receiving respectively the first and second materials as streams of such materials from extruders 12 and 14, though in the present FIG. 1 the coextrusion feedblock apparatus also comprises at least a third inlet for receiving a stream of the third material from extruder 16. Other features of these previous apparatus are preferably as disclosed in these prior disclosures, with similar accomodations being made for the presence of a third material.

As in coextrusion, the present invention relies upon the arrangement of the extruders and the feedblock apparatus to control the thicknesses, distribution, and arrangement of layers of the various materials to be included in the first composite stream. In this way, it is a relatively simple matter in the context of the teachings of the coextrusion art:

1) to order the layers of the first, second and third materials, for example, within a composite stream so that the third material may be initially advantageously placed;
2) to distribute the materials substantially evenly in the composite stream so that the distribution of the layers in the finished article will be relatively even also and the article will display a substantial uniformity of composition with respect to at least the layers of property-affecting materials adjacent a critical surface of the article; and/or,
3) to select a layer thickness for layers of each of the various materials so that subsequent manipulations of the emerging composite stream do not cause the layers of the various materials in the ultimately desired configuration to depart from a substantially continuous nature.

By "substantially continuous," it is meant only that the individual layers have significantly more of the character of a continuous layer extending throughout and around the walls or boundaries of an article, and more particularly adjacent a critical surface of the article, than any partial lamellae which would be created in accordance with or suggested by the teachings of the prior art.

We consider that no more than about 10 percent of these layers of the property-affecting materials of interest should have an interfacial surface area to unit thickness ratio of less than about 10:1 to realize the benefits and advantages of our invention, although preferably and typically the dimensions and thicknesses of layers created by the processes of our invention will be such that multilayer articles produced thereby have properties and a cross-sectional microscopic appearance approaching those of a thin, flat coextruded sheet. Thus, the interfacial surface area to unit thickness ratio for layers of the property-affecting materials of interest adjacent a critical surface of an article will preferably be at least about 100:1, and most preferably at least about 1000:1.

The referenced interfacial surface area to unit thickness ratio is calculated by resolving a layer into an element of length 1 and of width w, with a unitary thickness. Thus, where a layer is observed to approximate in interfacial surface area a rectangle of length $l_1$ and width $w_1$, and is observed to have an average thickness t, $l=l_1/t$ and $w=w_1/t$ approximately. The amounts l and w can be thought of as expressing the degree of extensiveness of a given layer in a direction compared to other layers of a like thickness. The interfacial surface area to unit thickness ratio of a given layer would be represented by the product $lw=(l_1/t)(w_1/t)=l_1w_1/t^2$.

Figure 11B:
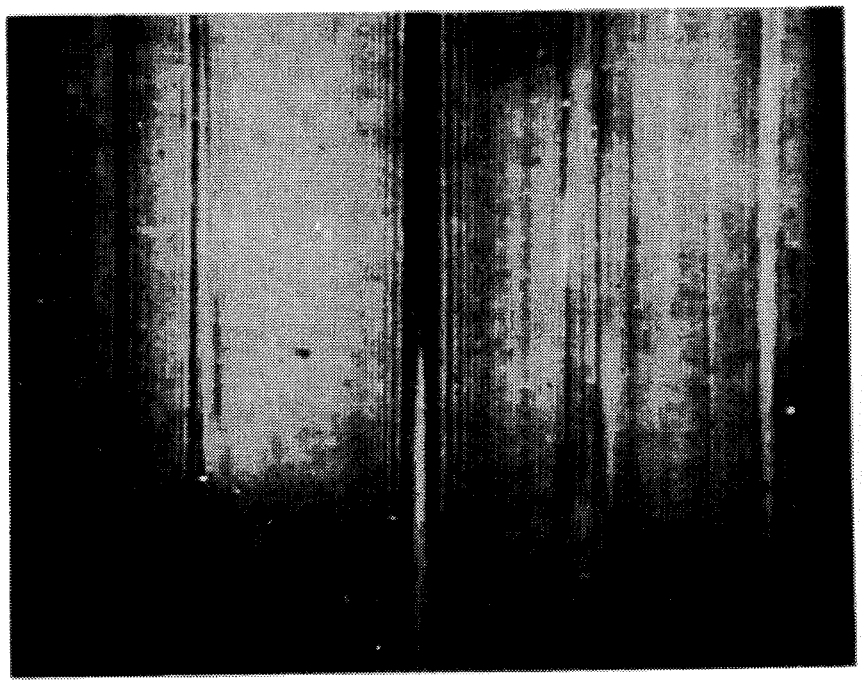
Figure 11A:
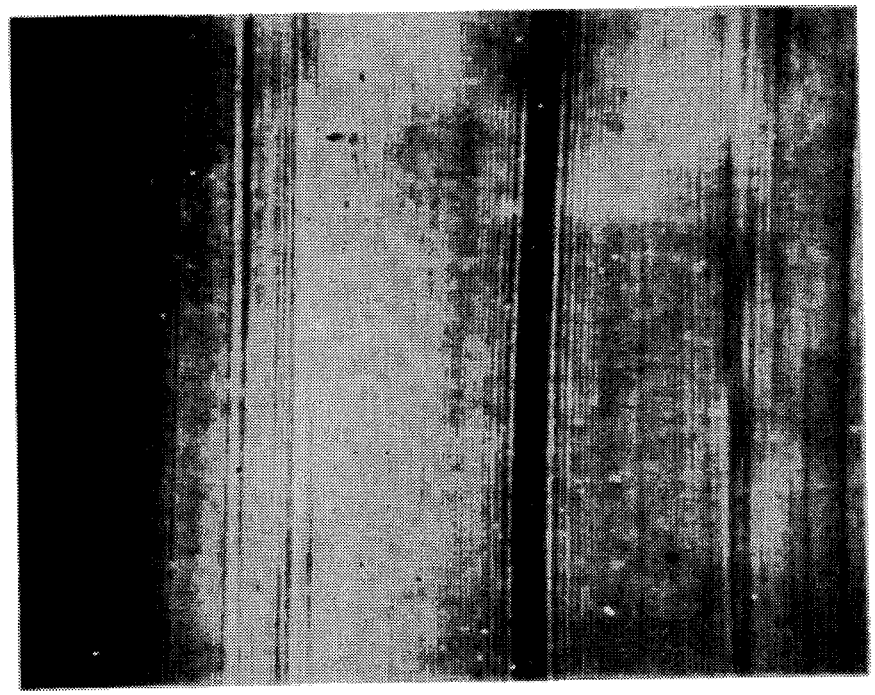

In considering how this ratio applies to describe our layers, one may refer to the cross-sectional photomicrographs of FIG. 11. These photomicrographs depict the cross-sections of a specimen from an article molded as described in Example 2 below. The specimen was cut to expose cross-sections in the direction of flow during mold-fill and in a direction perpendicular thereto. The thickest layer which is clearly visible in FIG. 11 can safely be assumed to encompass an interfacial surface area at least equal to the product of the width of photomicrograph A and the distance from the right edge of B to where the white material appears in the midst of the layer, or at least equal to about 3.5×1.5=5.25 square inches on the scale of the photomicrographs. On the same scale, the thickness of the layer appears not to exceed about 0.2 inches on the average, so that the interfacial surface area to unit thickness ratio for this layer appears to be at least about $5.25/(0.2)^2=131.25$.

Further, one can discern a number of layers immediately above the layer just discussed which appear to be fully continuous over the widths of both photomicrographs, and yet have a thickness substantially less than that of the thickest layer so that the interfacial surface area to unit thickness ratio for these substantially parallel layers should be much greater than the about 131.25 ratio seen for the thickest layer. For example, the layer immediately above the thickest layer would appear to have an interfacial surface area of at least about 3.5×3.5=12.25 square inches, and a thickness not exceeding 0.05 inches. The ratio for this layer would then appear to be on the order of at least $(3.5\times3.5)/0.05^2=(l_1w_1)/t^2=4900$.

Given that none of the layers in FIG. 11 exhibit large fluctuations in thickness, it appears likely that the layer above the thickest layer extends continuously for a still greater distance in both directions implicated in photomicrographs A and B, without dramatic corresponding increases in thickness such as would have the effect of decreasing the overall surface area to thickness ratio of the layer. Rather, the photomicrographs suggest that the full extent of the layer as seen on the scale of the photomicrographs may be significantly greater than 12.25 square inches while the average thickness of the layer would be the same or less than the 0.05 inches used above, so that the layer were it to be measured in full would have an interfacial surface area to unit thickness ratio correspondingly greater than even 4900.

Also by way of definition, a "substantial uniformity of composition" as used herein refers to the deviation of the local composition ratio within a wall of the molded article from the average composition ratio of the article as a whole, the latter ratio being determined by the ratio of feed rates of individual polymer components to the processes of the present invention. The local composition ratio refers to the composition ratio of a specimen from adjacent a critical surface of the molded article, the specimen being derived from within the composite stream in its desired configuration and having dimensions of at least the local thickness of the molded article in all directions.

A "substantial uniformity of composition" exists where local composition ratios along a critical surface of the article do not vary by more than about 20 percent, and preferably no more than about 10 percent, from the average composition ratio. In general terms, this substantial uniformity of composition is important in achieving a uniformity of properties along a critical surface of the article in the desired configuration, so that the full benefits of a lamellar construction can be realized without the formation of weak spots which might effectively defeat the purpose of the lamellar construction in the first placer and further such that at least the layers of the first, second and/or third or more materials are substantially evenly distributed adjacent the critical surface.

Returning to a discussion of the coextrusion feedblock apparatus 18 illustrated schematically in FIG. 1, it will usually be desirable to employ a 2, 3, 4 or 5-layer feedblock apparatus where only the first and second materials are used, so as to create for example with the 5-layer apparatus an ABABA-type layer structure in the first composite stream, or where first, second and third materials are used, creating an ABCBA-type structure for instance. In this circumstance where a 2,3,4 or 5-layer feedblock apparatus is used, it is thought that a feedblock such as is disclosed in U.S. Pat. No. 3,577,265 to Chisholm et al. should be satisfactory, and a number of total layers of the first and second, or of the first, second and third materials in excess of the 2, 3, 4 or 5 respectively created thereby may be created by employing means for manipulating the first composite stream from coextrusion feedblock apparatus 18 to form a second composite stream which has an increased number of layers of the first and second, or of the first, second and third materials compared to the first composite stream. This manipulation is characterized in FIG. 1 as "Layer Multiplication."

This means for manipulating the first composite stream to form a second composite stream preferably includes means for dividing the first composite stream to form a plurality of substreams which collectively comprise an increased number of layers of the first and second, or of the first, second and third materials compared with the first composite stream, and means for combining the substreams to form the second composite stream. The formation of the second composite stream from the first composite stream, and a preferred apparatus for accomplishing this formation are schematically shown in FIGS. 1 and 2, and shown in more detail in FIG. 3.

Figure 2:
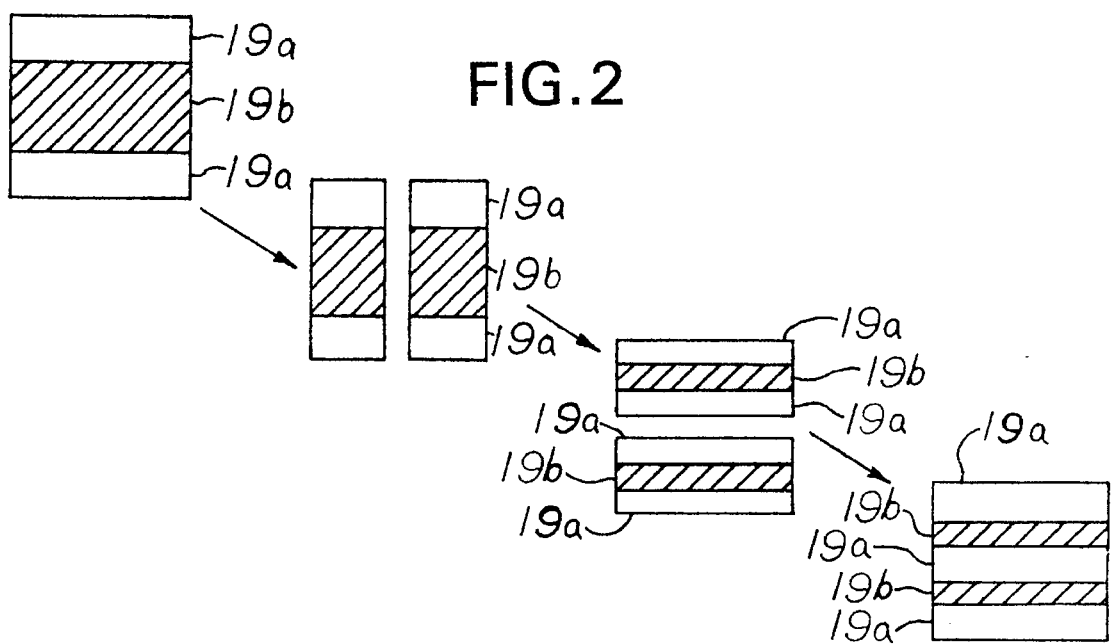
FIG. 2 is a schematic illustration of the formation of a second composite stream from a first composite stream in a preferred embodiment of the present invention.

Referring now to FIG. 2 specifically, a schematic of the creation of additional layers of the first and second materials of the first composite stream for the second composite stream is illustrated, and shows that a melt stream comprised of layers 19a and 19b, respectively, of the first and second materials in an ABA-type construction is divided in a plane which is generally perpendicular to the layers of the melt stream, then flattened and recombined by means for stacking the substreams. "Stacking" the substreams in this manner refers to the recombination of the substreams in a direction which is generally perpendicular to the layers of the substreams, such that the combined layers of the substreams are substantially parallel to one another.

Figure 3:
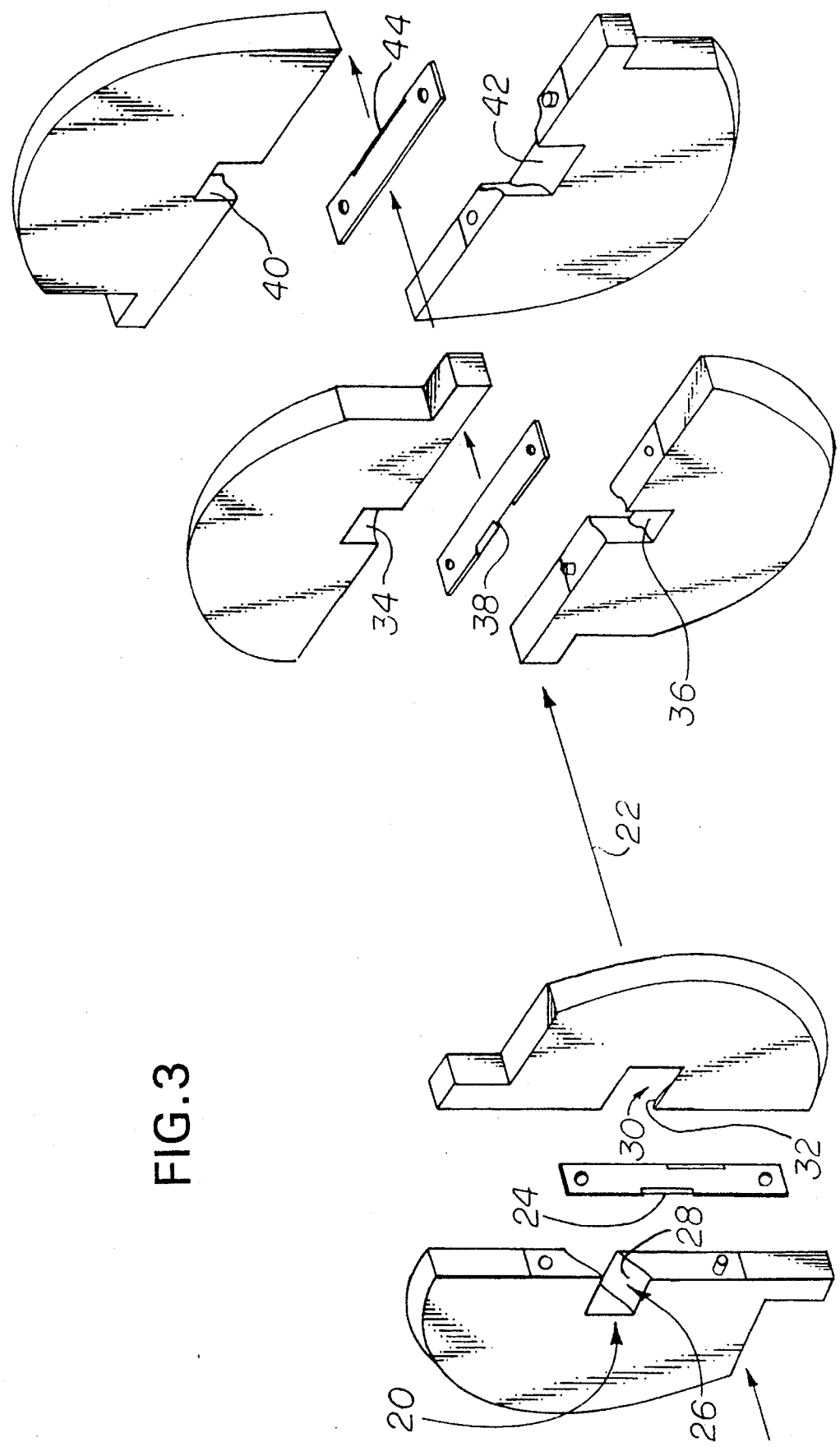
FIG. 3 is an exploded view of a preferred apparatus for forming a second composite stream from a first composite stream as schematically illustrated in FIG. 2.

An apparatus for dividing the first composite stream to form a plurality of substreams and to recombine these substreams to form a second composite stream by stacking the substreams is shown in FIG. 3. In FIG. 3 it can be seen that, at the entrance 20 of the interfacial surface generator (ISG) depicted in FIG. 3 a first composite stream represented by the arrow 22 is divided by a blade 24 which is generally perpendicularly oriented with respect to the layers of the first composite stream.

A substream 26 of the first composite stream ascends a generally rectangular shaped, sloping passageway 28 to the left of blade 24, while a second substream 30 of the first composite stream descends a passageway 32 to the right of blade 24 which is similar in shape to the passageway 28 but which slopes downward.

Substreams 26 and 30 are then essentially stacked by passageways 34 and 36, with passageway 34 forcing substream 26 back to the right and passageway 36 forcing substream 30 to the left. The layers are kept from mixing during these lateral movements by a blade 38 which is oriented generally parallel to the layers of the substreams 26 and 30.

Substream 26 is then flattened and forced downward in a passageway 40 while substream 30 is flattened and forced upward in a passageway 42, the substreams 26 and 30 again being prevented from mixing by a blade 44. The substreams 26 and 30 are then allowed to recombine to form a second composite stream which has a greater number of layers of the first and second materials than the first composite stream.

In an alternate preferred ISG to the ISG shown in FIG. 3, the layered first composite stream represented by the arrow 22 is divided at the inlet 20 into 4 substreams by three parallel vertical blades.

Each of the four substreams is made square in cross-section and carried through respective conduits which are also identically square in cross-section, so that the substreams are stacked in the manner of the ISG of FIG. 3. The substreams are then expanded gradually in a plane which is generally normal to a plane of the vertical dividing blades, contracted gradually in a plane which is generally coplanar with or parallel to a plane of these same blades, and then recombined in overlapping relationship by stacking the four expanded and contracted substreams at the outlet end of the device.

By using an apparatus such as is depicted in FIGS. 2 and 3 or as described in the immediately preceding paragraph, a great many layers of the various materials can be created by a sort of layer multiplication process.

An equivalent number of layers might be formed merely by using a larger coextrusion feedblock apparatus, such as disclosed in U.S. Pat. No. 3,884,606 to Schrenk et al., and the coextrusion feedblock apparatus of that patent is preferred over more conventional feedblock apparatus employing a linear feedblock where a fairly large number of layers is to be generated without the use of the sort of apparatus described above and depicted in FIGS. 2 and 3.

Under such circumstances, an apparatus as disclosed in U.S. Pat. No. 3,884,606 should be less likely to contribute to a significant proportion of the layers at the edges of the first or second composite stream becoming discontinuous on forming the stream into a desired configuration.

As a rule, though, as compared to the use of a coextrusion feedblock apparatus alone, a 2, 3, 4 or 5-layer coextrusion feedblock apparatus is preferably used in combination with one or more of the apparatus depicted in FIGS. 2 and 3 and most preferably with one or more of the alternate preferred ISG apparatus described above, although other ISG's are available which may be used also. Examples include the Ross ISG static mixer available from Charles Ross & Son Company, P.O. Box 2200, Hauppauge, N.Y. 11787, and those generally described in U.S. Pat. No. 3,195,865, the disclosure of which is incorporated herein by reference.

The preferred ISG's of the present invention generally produce less distortion of the nonrandomly arranged composite stream emerging from the coextrusion feedblock apparatus, however, and a greater uniformity in layer thicknesses within the second composite stream and in an injection molded article having a desired configuration than do prior ISG's with respect to layers of a given material. This difference is particularly illustrated in FIG. 4, which shows a series of comparative photomicrographs of cross-sections of a wall of a can which has been injection molded from layers of brown and white polypropylene, using ISG's of the type shown in FIG. 3 and Ross ISG's.

A lesser distortion of the first composite stream in the creation of the second composite stream should typically mean a lesser departure from the properties and characteristics desirably imparted to the first composite stream in the coextrusion feedblock apparatus 18, and a greater likelihood of those characteristics being transferred through to the finished article with fewer variables being involved in trying to achieve a desired configuration of that article having those properties.

The alternate preferred ISG can be used in combination with the ISG's of FIG. 3 to give the same number of options, in terms of the number of layers to be formed in the second composite stream, as would be available were the elements shown in FIG. 3 used exclusively. For example, whereas a five-layer symmetrical first composite stream passing through six successive elements of the type shown in FIG. 3 will create a second composite stream having 257 total layers, the same number of layers can be created with a combination of three of the elements of the alternate embodiment with one of the elements shown in FIG. 3. It should also be noted in passing that the elements of FIG. 3 could also be combined with other ISG's such as the 4-channel Ross ISG's in an appropriate case.

Determining when one might desire to use a coextrusion feedblock apparatus only or in an ISG/feedblock combination with those elements shown in FIGS. 2 and 3, the four-channel alternate preferred ISG, any of the previously known ISG's, or any combination of such ISG's depends on a number of considerations, including for example:

1) whether the equipment is to be dedicated to a particular application for a sufficient length of time that the decreased flexibility involved in using a feedblock apparatus alone is not counterproductive in an overall sense, 2) whether the application is of such a demanding nature that the distortion involved in the manipulation of layers in the ISG's that would be required is of a sufficient nature that the generally increased fabrication costs associated with a complex feedblock apparatus is offset;

3) the availability of space and equipment, and specifically as to the latter, the availability of an appropriate feedblock apparatus;

4) the degree of distortion introduced with each ISG, within the limits imposed on the length of the ISG's by degradation and space concerns; and 5) whether a degree of degradation may be tolerated with respect to certain materials in the interests of lesser layer distortion through the ISG's.

The significance of greater layer uniformity being transferred through to the finished article by the careful selection of appropriate layer generation, arrangement and/or multiplication means lies in part, it is believed, in the optimization of those properties which are enhanced by a lamellar construction.

It has generally been noted that for a given system of diverse thermoplastic resinous materials in a given mold geometry, an optimum mix of properties may correspond roughly to a given number or range of numbers of layers of such property-affecting materials. Where this number of layers is large, or the wall thickness locally small adjacent a critical surface of the article, it may be difficult to achieve this optimal blend of properties throughout an article.

Further, it is generally true that all other things being equal, the larger the number of layers across a cross-section of the wall of an article, the greater the improvement in those properties which are enhanced by a lamellar construction, so long as the layers are substantially co-continuous across that cross-section of the article.

A significant variation in the layer thicknesses of a given property-affecting material across such a cross-section can be viewed as effectively reducing the number of layers of such a material as some layers approach a discontinuous nature, and while the effect of the difference in the amount of distortion involved in using one type of ISG as opposed to another might be small in one application, for other systems the effect might be sufficiently significant to warrant a preference for those ISG's of the present invention.

Whether the desired number of layers is created in a second composite stream by the combination of a coextrusion feedblock apparatus and an ISG or a series of ISG's, or in a first composite stream merely by a coextrusion feedblock apparatus, a resulting layered melt stream is formed into a desired configuration by means for accomplishing this function, or the stream may first be passed through what has for present purposes been termed a "symmetricizer".

A "symmetricizer" is a device which has been developed for reducing the number and extent of exposed layer edges in a layered melt stream including diverse thermoplastic resinous materials prior to forming the stream into a desired configuration by injection molding, compression molding, transfer molding, injection blow molding, displacement blow molding or extrusion blow molding, and for correspondingly reducing the exposure of layer edges in that desired configuration of an article.

A symmetricizer would be appropriately employed where the properties which are sought to be enhanced by a lamellar construction could be significantly adversely affected by the exposure of a number of layer edges at a surface of the finished article to external influences, and where because of the mold geometry, method of forming the article, the materials used, etc., such exposure is likely to occur. One example of such a situation might be where a saponified ethylene-vinyl acetate copolymer is being used to provide an oxygen barrier to an article produced in accordance with the present invention, where upon exposure to moisture in the article's environment a loss in barrier and mechanical properties can be expected.

While a symmetricizer may be used also where it is desirable to encapsulate a layered stream within another material, such that the symmetricizer would reduce the number or extent of layer edges not at a surface of the article but at the interface of the "core" layer with the encapsulating other material, it may be desirable in other applications to simply encapsulate a layered first or second composite stream within the other material.

These other applications could arise for example where a symmetricizer is not available or would not eliminate external disturbances to a sufficient degree, or where, at the number of layers created in the composite stream to be molded for a given set of properties, the resulting article would otherwise have an undesirable outward appearance. It is nevertheless intended that the description of the character of layers of the various materials "adjacent" a critical surface also describe layers which have been encapsulated in this manner.

In general however the means suggested by the present invention for reducing the exposure of layer edges in a layered melt stream comprises means for dividing the stream into two or more substreams having layers of thermoplastic materials, and means for combining these substreams such that a majority of the layers of one of the substreams are generally angularly oriented with respect to a majority of the layers of a second substream.

What is generally intended in the operation of the symmetricizer device of this invention is first, to dispose some of those layer edges which would otherwise initially come into contact with the walls of a mold at a perpendicular angle and freeze in such an orientation so that they initially contact the walls, if at all, at a significantly greater or lesser angle.

Secondly, it is thought that placing the majority of the layers of one of the substreams at an angle with respect to the majority of the layers of a second substream will create a tendency of the layer edges to enfold one another.

In the enfolded structures, the greater portion of layers of the first, second and third materials will preferably lie generally parallel to a critical surface, but with the layer edges of sensitive layers being interwoven and overlapping rather than intersecting a critical surface of the article.

Parenthetically, some degree of layer distortion is occasioned by this manipulation of the stream to be molded or otherwise formed into a desired configuration. The effects of this layer distortion are a cost associated with a reduction of exposed layer edges in the article, and it is expected that this cost will need to be considered in determining whether the use of a symmetricizer generally or of a particular variety may be appropriate for a given application of the present invention.

The desirability of incorporating a symmetricizer into an apparatus for injection molding a first composite stream or a second composite stream into a desired configuration, and for thereby forming a multilayer plastic article is considered to be primarily dependent on the geometry of the mold for producing the article in its desired configuration, and on whether the apparatus for making a multilayer article also includes multicavity injection molding apparatus.

In multicavity injection molding it may not be necessary to employ an apparatus for reducing the exposure of layer edges where the use of the article and the materials used in constructing the article might otherwise suggest the advisability of such an apparatus, in that the flow of the layered stream through runners and gates will usually sufficiently randomize the layers of the stream to reduce the number and/or extent of exposed layer edges in both the layered stream and the finished article. Nevertheless, even in multicavity injection molding a symmetricizer may still be of some benefit in terms of the properties of articles produced thereby, and the desirability of employing a symmetricizer in any particular set of circumstances might more suitably be judged on a case by case basis.

Figure 5A:
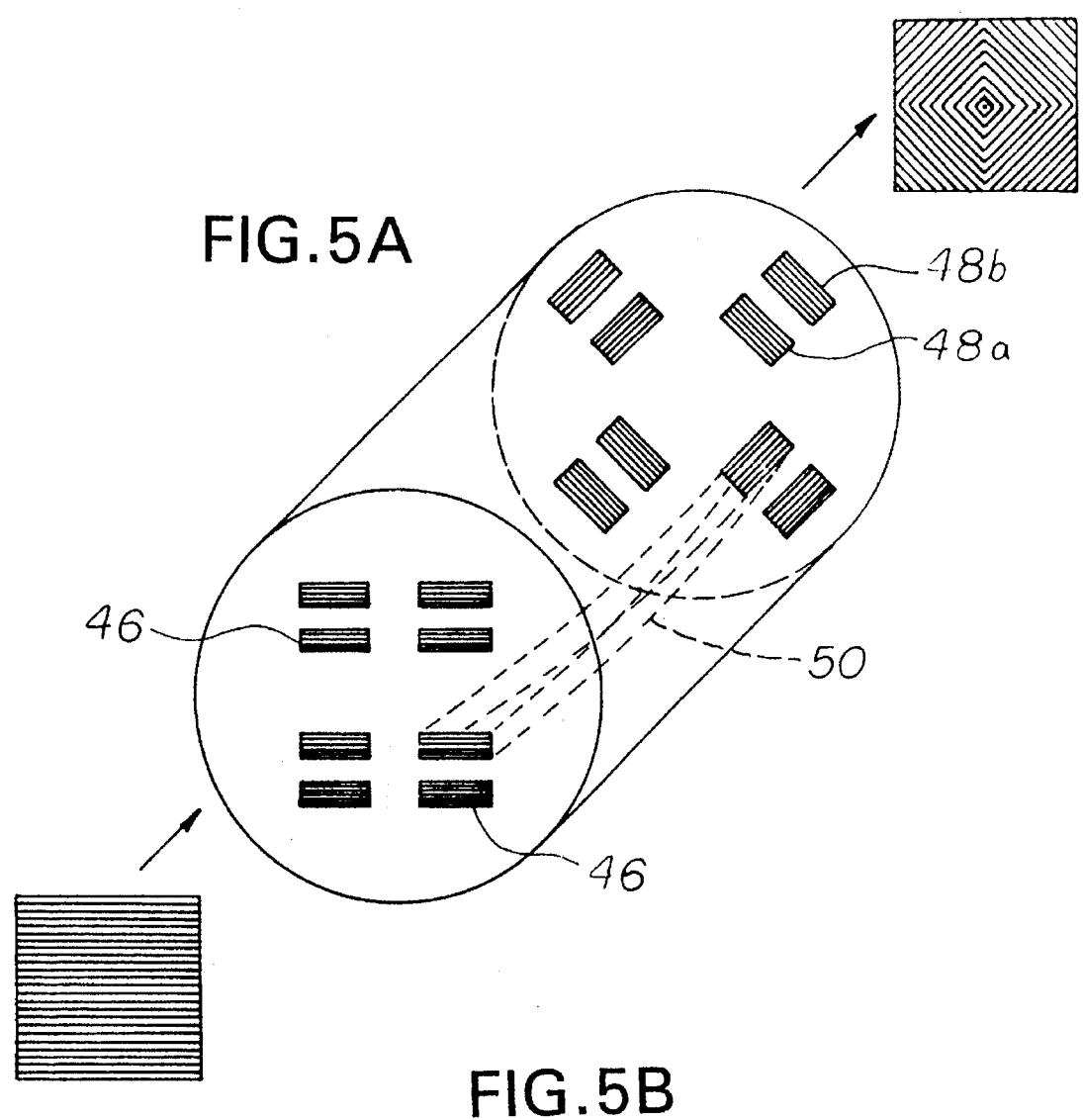
FIG. 5A schematically depicts a preferred apparatus for reducing the exposure of layer edges of a layered stream.
Figure 5B:
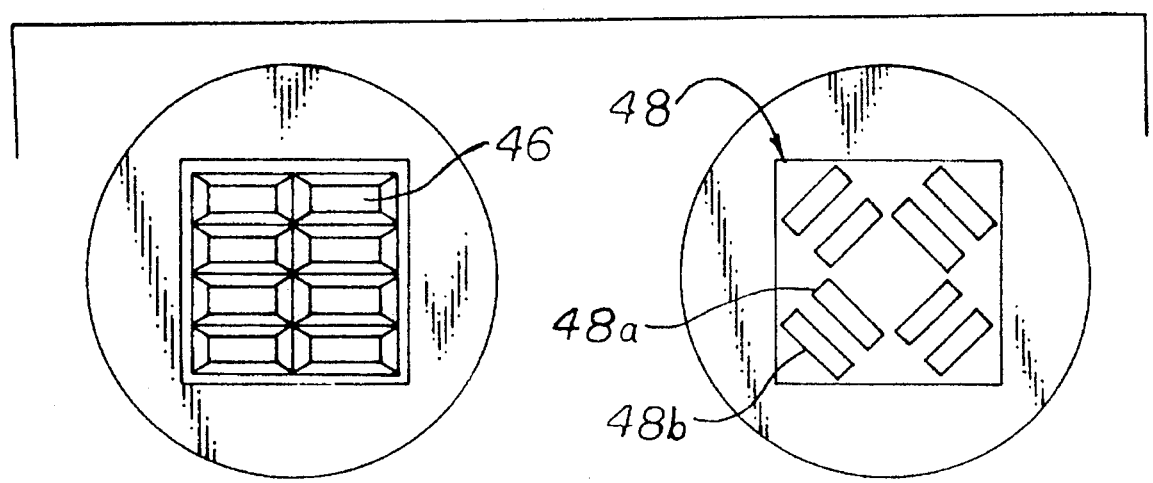
FIG. 5B depicts the inlet and outlet sides of the apparatus of FIG. 5A.

A preferred symmetricizer is shown in FIGS. 5A and 5B, and comprises a plurality of inlet ports 46 and a plurality of outlet ports 48, the outlet ports 48 being generally divided into central outlet ports 48a and peripheral outlet ports 48b. Inlet ports 46 are generally rectangular in shape, and preferably have a long dimension which is parallel to the layers of first, second and third materials of the first or second composite stream which are received therein. The internal channels 50 of the symmetricizer which correspond to inlet ports 46 and outlet ports 48 are preferably of a constant rectangular configuration which matches that of corresponding inlet ports 46 and outlet ports 48, and preferably provide an incrementally consistent change of orientation from an inlet port 46 to an outlet port 48, as suggested in FIG. 5A. As shown, outlet ports 48a associated with substreams of the first or second composite stream passing therethrough are oriented substantially at a 90° angle with respect to one another, as are outlet ports 48b.

Figure 6A:
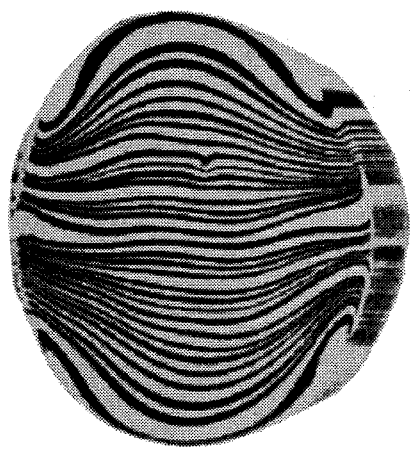
FIG. 6 is a photomicrographic view of a section of a layered melt stream before and after passing through the apparatus of FIG. 5.
Figure 6B:
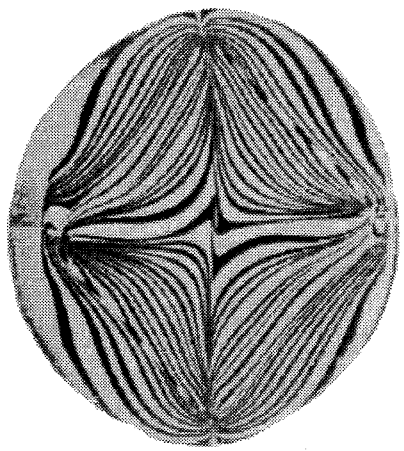
Figure 10A:
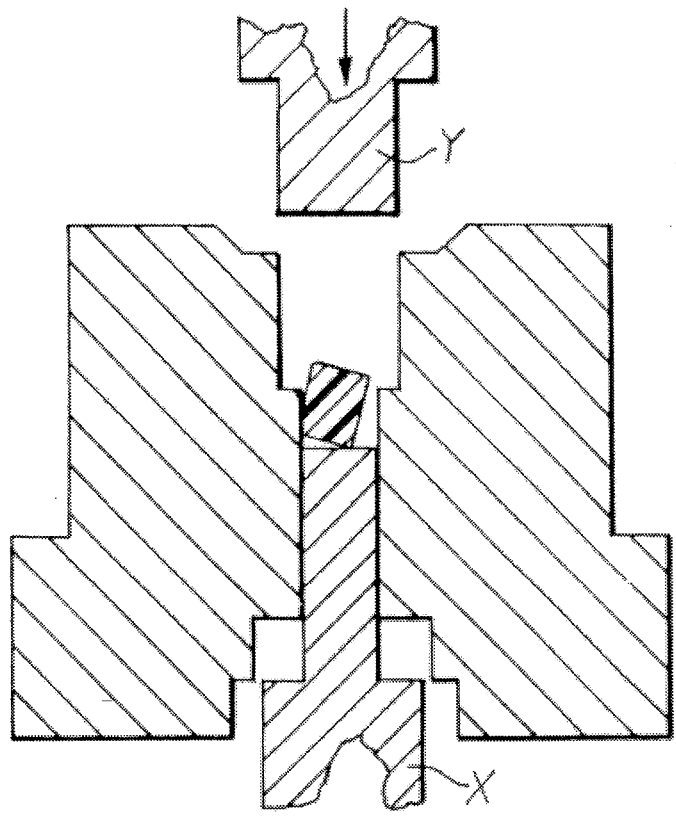
FIGS. 10A–C shows a transfer molding apparatus as used to demonstrate the present invention.

An illustration of the transformation worked by the symmetricizer of FIG. 5 may be seen in FIG. 6, which depicts cross-sections of a layered melt stream of brown and white polypropylene prior to and following passage through a symmetricizer configured as in FIG. 5. An indication of how the reduction in exposed layer edges accomplished by the symmetricizer can translate through the formation step to a finished article can be seen in FIG. 7, which depicts photomicrographs of cross-sections of the walls of cans injection molded from the same brown and white polypropylene with and without the symmetricizer. As may be seen from FIG. 7, the symmetricizer appears to have reduced at least the extent of layer edges which are perpendicular to a surface of the can, if not the number of such edges.

Referring back to FIG. 1, it can be seen that the first or second composite stream is thereafter molded into a desired configuration by the preferred injection molding process or by other processes including compression molding, transfer molding, injection blow molding, displacement blow molding and extrusion blow molding.

The preferred manner of forming a first or second composite stream of the present invention into a desired configuration would, as previously suggested, involve some sort of injection molding. Coextrusion, though, has generally been developed as a continuous process, while injection molding is an intermittent process. One possible way in which the invention could be practiced with both processing methods integrated therein would use accumulators and valves to direct flow to one accumulator during the molding cycle of another.

Another possible way would be to use reciprocating screw injection of each of the first, second and third materials through the coextrusion feedblock apparatus so that intermittent flow for injection molding is established before and during layer generation and arrangement into a composite melt stream, rather than afterwards.

Data have not been specifically gathered to determine whether one of these techniques is preferable in terms of the qualities which are sought in the finished article, but it is believed that either of the techniques discussed above may be selected and used without undue experimentation to successfully practice the present invention.

A most preferred manner of forming a composite stream into a desired configuration involves multicavity injection molding. Previously, although it had been demonstrated in U.S. Pat. No. 3,716,612 that a lamellar construction could be transferred from a layered melt stream into a finished article after injection molding, it was not known whether such a lamellar construction could be maintained throughout the full extent of a multicavity mold where one of the layered components was present as a minor phase (less than about 15 percent by volume, for example). By the present invention, a lamellar construction can be maintained throughout the extent of a multicavity mold for even minor components within a lamellar melt stream.

Examining the operation of the apparatus described above in performing the methods of the present invention for making multilayer plastic articles, one potential application would be in the making of plastic containers for carbonated beverages. Such containers have in the past been made of polyethylene terephthalate (PET), which forms a fairly good barrier to the loss of carbon dioxide from the beverage. In an effort to lengthen the shelf life of these beverage containers, especially for smaller such containers, one might wish to create a multilayer structure incorporating layers of PET and of a resin with a better barrier to $CO_2$, such as an ethylene vinyl alcohol (EVOH).

In considering how one might achieve the benefits of the present invention with a PET/EVOH system as the first and second diverse thermoplastic materials, one approach that is presently foreseen would first match the viscosities of the PET and EVOH over a range of nondegradative temperatures within the general limits suggested by the coextrusion art, given the sensitivity of the system to discontinuities in layers and similar such considerations. For purposes of the present invention, generally materials having viscosities that differ by no greater than a factor of five can be appropriately used together in the present invention, and even greater viscosity mismatches might be tolerated, although the upper limits on this are not presently known.

The next step would be to consider whether PET and EVOH are sufficiently self-adhering to possess adequate structural integrity for a carbonated beverage container. If not, a third, compatibilizing material needs to be selected to adhere layers of the PET and EVOH together in the finished article.

A variety of compatibilizing materials are known, and may be advertised as adhering to both PET and EVOH, or may be known to adhere to both. Of those materials which emerge as potential candidates for use as the third material, one would select materials for further evaluation which could be matched to the PET and EVOH rheologically within the nondegradative temperature range established earlier, and which would not themselves degrade at the temperatures of interest.

The candidates could then be coextruded with the PET and EVOH in a standard five layer coextrusion feedblock apparatus, and peel tests conducted of the resulting structure to determine which of the candidate materials provided adequate adhesion and the amounts of such materials necessary to provide such adhesion. Taking into account such things as the materials cost associated with providing an adequate degree of adhesion and the availability of the material, a selection would then be made of the third material to be used.

The first, second, and third materials would then be melt coextruded with proper temperature controls on the source extruders to match the rheologies of the various materials, and with the second and third materials generally being used in the minimum amounts thought necessary to achieve a desired barrier, since the second and third materials will typically be more expensive than the first material whose purpose will normally be primarily of a structural nature. In this regard, it has been found that the second material can typically comprise less than about 10 percent by volume of the first composite stream without the layers of this material becoming discontinuous to an unacceptable degree when employed in a method and apparatus of the present invention.

The lesser of the first and second materials (for convenience, heretofore deemed to be the second material) may be used in such small amounts or the number of layers in a composite stream increased to the point where layers of this material approach a thickness of molecular dimensions, on the order of 150 Å, although generally the sustained production of layers of these dimensions is not a practically realistic expectation.

One or more ISG's or a different feedblock may then be employed, as discussed earlier, to increase the number of layers. Testing of the articles produced by the process for various numbers of ISG's should establish whether the desired barrier can be achieved for the materials and levels of materials employed. It should be noted that the ISG's used will generally be controlled as to temperature as well to ensure that throughout the process the rheologies of the various materials remain properly matched without degradation having occurred with respect to one or more of the constituent materials of the melt stream.

This degradation will be a function of the temperatures experienced within the process as well as of the time in which the materials are exposed to these temperatures. Thus, the number of ISG's of a given length which can be employed may be limited, or the length of a given number of ISG's limited. We have found for the ISG's shown in FIGS. 2 and 3 that longer ISG's result in a more gradual manipulation of the incoming layered melt stream and a greater uniformity of the outgoing stream through the thickness of the stream. This greater uniformity through the thickness of the stream is desirable in lessening the likelihood of unacceptable layer distortions and discontinuities in the finished article. It would therefore be desirable to use longer ISG's in the creation of the composite stream to be formed into the desired configuration, unless degradation of one or more of the materials in the melt stream is a problem. Other considerations may limit the length of the ISG's used for a given resin system and application, such as space limitations, for example, but degradation is of particular concern for most such systems and applications.

The foregoing illustrates one possible approach to applying the methods and apparatus of the present invention, although other approaches are believed possible and should be apparent to persons of ordinary skill in the art in view of the discussion above and of the examples which follow.

It may be that the only properties which are sought to be enhanced by a lamellar construction of an article are those relating to the appearance of the article. The teachings of this disclosure and specifically the apparatus taught herein may be adapted to this use as well, and this use is considered encompassed within the scope of the present invention.

The methods of the present invention and apparatus for performing the methods, and the articles which result therefrom are perhaps best further illustrated by the following examples. These examples are offered only by way of illustration and should not be taken in any way to limit the scope of the present invention as defined in the claims below.

EXAMPLE 1

In this example, a melt stream having a total of 129 alternating layers of brown and white pigmented polypropylene was created by extruding the brown and white polypropylene material through a three layer coextrusion feedblock apparatus, then feeding the resulting first composite stream through three of the four-channel Ross static mixers in series.

Extrusion rates within the apparatus of the present invention are in general calculated from the desired composition ratio in the molded part. Volumetric screw feeders were used in this and subsequent examples to meter pellets of the second and of the third compatibilizing material, if present, into 1 ¼ inch single screw 24:1 L:D extruders, with the extruder screw speeds set to maintain a starve-feed condition. The screw speed of the 1 ¾ inch single screw 24:1 L:D extruder used for the first or major material was then adjusted in this and other examples to obtain the desired total rate, which is determined by weight measurements with all of the extruders running.

It should be noted here that a selection of polymer grades and an adjustment of individual melt temperatures to ensure a viscosity mismatch of a factor of no greater than 5 was undertaken in some of the other examples to obtain an acceptably uniform distribution of layers in the melt stream cross-section, as a severe mismatch in polymer viscosities can cause higher viscosity materials to channel through the center of the melt stream, resulting in edge-to-edge layer non-uniformity and local cross-sectional variation of composition ratio. Because the brown and white polypropylene used in this example had identical rheologies, however, these adjustments were not required for this particular example.

Ten ounce cans were transfer molded in a molding machine from a melt stream constructed as described above, with some cans being made after having had the melt stream pass through a symmetricizer as previously described. A layered "gob" was hand cut from the melt stream emerging from an ISG or from a symmetricizer and was manually deposited into the cold can mold shown in FIGS. 10A–C. Cans produced by the apparatus by bringing piston X and mold core Y together in the manner suggested by FIGS. 10A–C were studied by optical microscopy of specimens cut parallel and perpendicular to the flow direction of the material being molded, to verify the retention of the lamellar morphology of the melt stream and to ascertain the continuity or lack of continuity of the lamellae in the articles.

Substantially continuous layers were observed in all portions of the cans, and insofar as could be discerned by optical microscopy, cans formed after the addition of other ISG's to the series also possessed substantially continuous lamellae.

Fountain flow during mold fill was seen to have caused some layers to deform, stretch and fold over as materials diverted from the center of the mold channel to the mold wall, so that the number of layers in a cross-section was apparently increased and the orientation of layers relative to the inner or outer surfaces of the can varied along the sidewall's length. The apparent thickness of some of the layers shown in the accompanying photomicrographs may be somewhat deceiving, then, in that some of the layers must have been cut on a diagonal. This stretching and folding over did not appreciably affect the continuity of layers within the article, though.

Figure 7A:
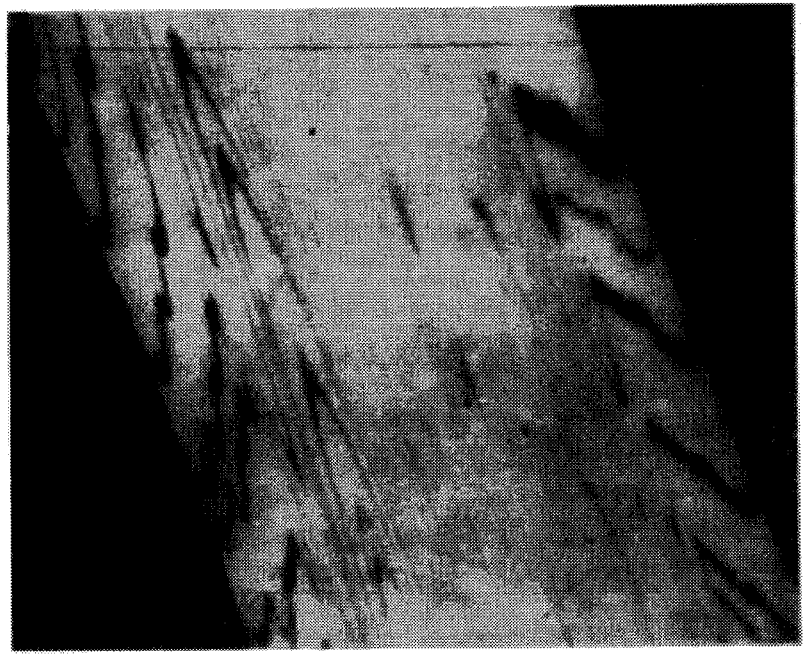
FIG. 7 is a set of photomicrographs of cross-sections of articles formed by transfer molding the melt streams produced in FIG. 6.
Figure 7B:
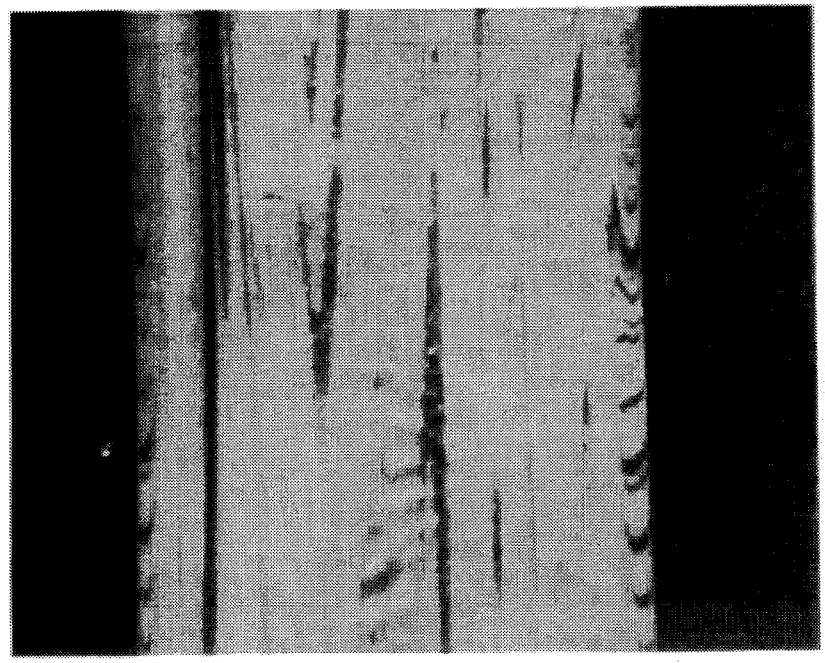

Considering the photomicrographs of FIG. 7, representative can sidewall cross-sections are shown which demonstrate the effect of the use of a symmetricizer. Layer edges without the symmetricizer solidified to a depth of approximately 20 percent of the wall thickness from both surfaces before the layers became substantially parallel to the surfaces. In applications where engineering properties are of concern, having such a large portion of the layers perpendicular to a major surface can result in part weakness where the polymers involved are dissimilar. In barrier applications, essentially 40 percent of the sidewall thickness may not contribute to barrier and the remaining barrier can be diminished by exposure to external influences where the barrier material used is sensitive to such external influences.

In contrast, cans molded from a melt stream proceeding from a symmetricizer exhibited fewer layer edges at the inner and outer surfaces and layers were essentially substantially parallel to mold surfaces throughout the sidewalls of the container, as seen in FIG. 7. The symmetricizer is thus seen as diminishing the depth to which layer edges would otherwise persist into a part wall, rather than eliminating the intersection of these edges with the wall altogether, since lamellae are always present at the mold surface as they solidify during mold fill.

It should be noted for future examples using the can mold and transfer molding apparatus described above and shown in FIG. 10 that some difficulties were experienced with regard to the bottoms of cans produced by the apparatus. Layer patterns were generated in the can bottoms which were not matched by patterns created in the sidewalls of the cans, and such patterns are believed to be due to a number of factors peculiar to this transfer molding apparatus and process.

When the "gob" is first dropped into the mold cavity some solidification occurs, freezing relatively thick layers at the surface. With the mold closed and the piston forcing the charge into the cans sidewalls, solidification continues at the piston face and on the mold core while the molten core materials fill the sidewalls. With dissimilar polymers, delamination can occur, and is observed to occur as the bottom is compressed in the last stage of molding, when much of the material comprising the bottom has already solidified. Injection molding through a gated mold cavity will substantially avoid these distortions.

Thus, while transfer molding has initially been used to simulate as nearly as possible actual simple injection molding in the absence of a suitable injection molding machine, the difficulties experienced with the can bottoms just described makes these transfer molded cans as a whole somewhat inferior with respect to cans which could be expected from actual injection molding, while such cans as were made are nevertheless sufficient to demonstrate the operability of the present invention. To obtain a better representation or approximation of the multilayer articles which would be produced by such actual injection molding, property evaluation with respect to the cans of this and other examples has been limited to the sidewalls thereof whenever possible.

EXAMPLE 2

In this example, the same brown and white polypropylene was used with a coextrusion feedblock apparatus alone to create a first composite stream having 233 layers, which was then transfer molded as in Example 1. No symmetricizer was employed. Specimens which were cut from throughout the sidewalls of the resulting cans, both parallel and perpendicular to the flow direction of the material being molded, showed substantially co-continuous lamellae also. Representative photomicrographs are provided in FIG. 11, and show the lamellae for a given specimen in the direction of flow and in a direction perpendicular to the flow of materials during mold-fill.

EXAMPLE 3

Figure 8:
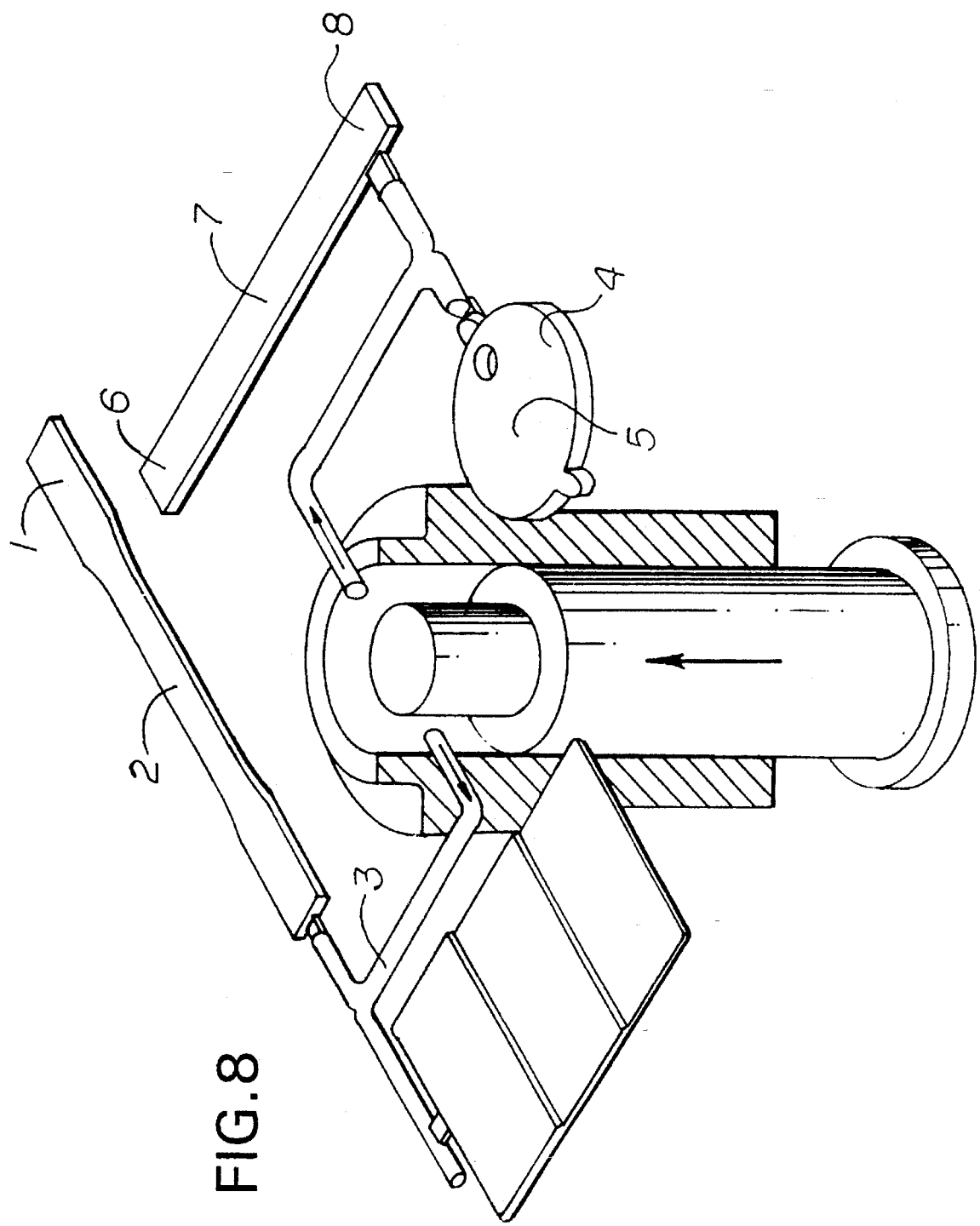
FIG. 8 is a depiction of the location of cross-sectional micrographs taken with respect to transfer molded parts in a simulation of multicavity injection molding.

In this example, the same apparatus was employed as in Example 1, except that the can mold of FIG. 10 was replaced by the multicavity test specimen tooling of FIG. 8, and that the three Ross ISG's of Example 1 were replaced by six ISG's of the variety shown in FIG. 3. The four cavity test specimen mold was selected to provide standard ASTM test specimens for purposes of testing mechanical properties and to more closely simulate conventional injection molding, since in the test specimen mold a lamellar melt stream would flow through standard runners and gates and to four mold cavities of differing geometries.

The same brown and white polypropylene materials used in Example 1 were formed into a 129 layer melt stream, and the melt stream molded into the four test parts. Optical microscopy of cross-sections taken in the places indicated in FIG. 8 resulted in the photomicrographs shown in FIG. 9. Substantially continuous lamellae were observed throughout, and a substantially uniform composition appeared to have prevailed throughout all cavities irrespective of runner length and cavity flow length.

EXAMPLE 4

This example explores the effects of using an ISG of the type shown in FIG. 3 versus a commercially available ISG in an otherwise identical process. Cans were made from the brown and white pigmented polypropylene materials of Example 1 in an apparatus constructed as in Example 1 and using in some runs three of the Ross ISG's and in other runs six of the ISG's shown in FIG. 3. Photomicrographs shown in FIG. 4 demonstrate clearly that the ISG's of FIG. 3 produce a significantly better uniformity of layer distribution than do the Ross ISG's, as has been previously suggested.

EXAMPLE 5

In this example the beneficial effects of employing the method and apparatus of the present invention to create the multilayer articles of the present invention are measured with respect to a specific barrier application.

Multilayer cans were molded from a second composite stream in two wall thicknesses, 32 and 42 mils, and in the can molding apparatus of FIG. 10. A high density polyethylene was used as the first material and possessed a melt index of 8 grams per 10 minutes and a density at 25° C. of 0.954 grams per cubic centimeter. The second material comprised an ethylene vinyl alcohol copolymer having a 29 mole percent ethylene content, a melt flow rate of 8 grams per 10 minutes, and a density of 1.21 grams per cubic centimeter at 25° C., such a copolymer being commercially available under the mark Soarnol D™ from Nippon Gohsei.

Because the HDPE and EVOH do not adhere to one another well, an anhydride-modified, linear low density polyethylene-based Plexar 2581™ adhesive resin produced by Quantum Chemical Company was selected as the third material for adhering layers of the EVOH and HDPE together.

Figure 10B:
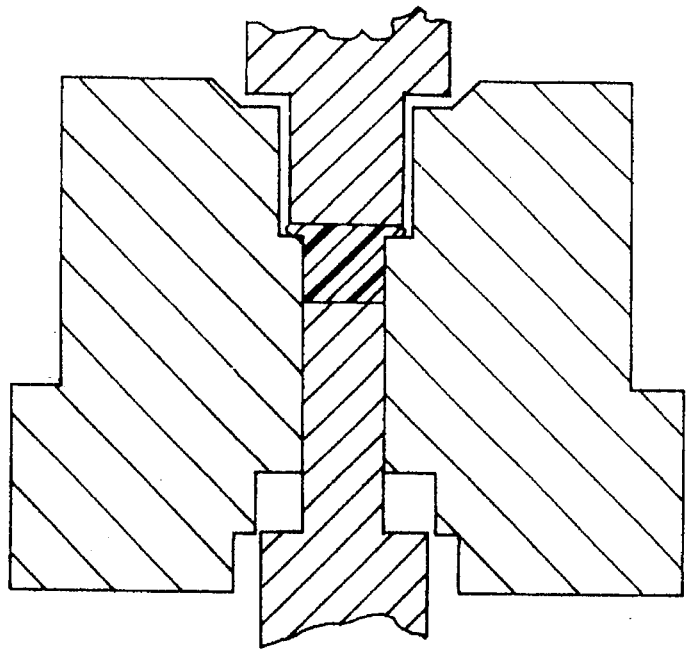
Figure 10C:
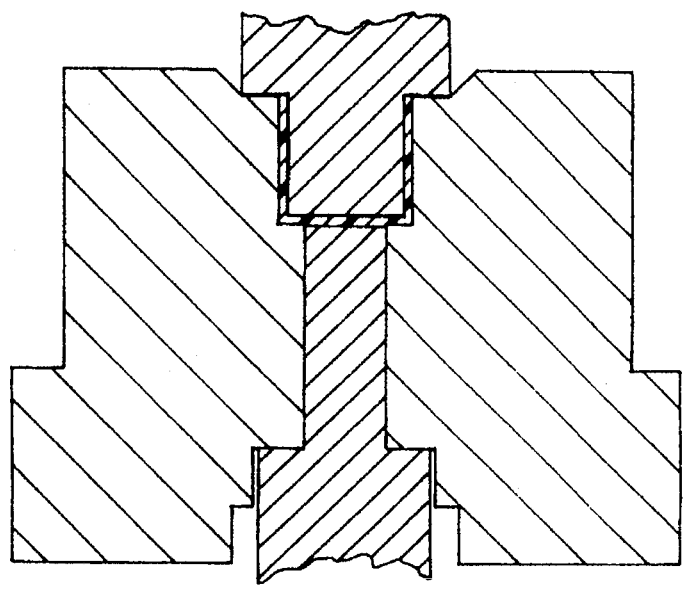

Each of the components was fed to an extruder as in Example 1, and combined in a five layer feedblock in an ABCBA-type layer order having layers of high density polyethylene, adhesive resin or compatibilizing material, and EVOH as the A, B, and C, respectively. The first composite stream thus created was manipulated in a series of ISG's to form a second composite stream, with both Ross ISG's and those of the type shown in FIG. 3, respectively, being employed in various runs. The second composite stream was then passed through a symmetricizer as in FIG. 5 and molded in the apparatus of FIGS. 10A–C by dropping a "gob" on the retracted piston X (FIG. 10A), lowering mold core Y (FIG. 10B), and then raising piston X to simulate injection molding (FIG. 10C).

The cans of 32 and 42 mil sidewall thicknesses thus formed were subjected to a number of tests, and the number and type of ISG's used, and the amounts of EVOH and compatibilizing material used were varied in different runs to quantify the effect of these variations on the performance characteristics of multilayer cans made by a method and apparatus of the present invention.

The following basic measurements were undertaken in this example:

A. Oxygen Barrier Measurements—The molded cans were double seamed with aluminum lids and sealed with epoxy. Oxygen permeabilities were measured at 23° C. and 60 percent relative humidity on Modern Control's Oxtran 1050™ permeability tester. An average of three cans was tested for each condition or each run.

B. Xylene Permeability Measurements—The cans were filled with xylene, double seamed with aluminum lids and sealed with an epoxy resin. These were then placed inside a catch tray in an adequately vented hood, and weighed as a function of time at regular intervals over a period of 20 days to monitor the rate of loss of xylene at ambient temperature. An average of two cans was tested for each condition.

C. Microscopic Verification of Lamellar Morphology— For verification of the lamellar morphology in the can walls similar to that undertaken in previous examples with respect to the brown and white pigmented polypropylene, low voltage SEM microscopy was used. Sidewall cross-sections of the can near the bottom, in the middle and near the lip were examined in both the axial and hoop directions.

D. Environmental Stress Crack Resistance—To assess their resistance to environmentally induced failures, the molded barrier containers associated with each run were evaluated according to the ASTM D2561-84 procedure. The molded cans were filled with 10 percent Igepal® C0630 detergent solution produced by GAF Corporation and double seamed with aluminum lids. Each container was placed in a separate reclosable plastic storage bag and placed in the hood at room temperature. The containers were inspected at regular intervals of time for evidence of cracks or leakage of the contents thereof, with the time to observation of the failure of a container being recorded. A minimum of three containers were tested for any given run.

Results of Testing and Discussion of Results

A. Oxygen Barrier Characteristics

The barrier performance of the molded containers was investigated as a function of the total number of layers in the melt stream entering the formation or molding process, the amount of EVOH barrier resin, and the amount of compatibilizing material used.

Before proceeding further it should be noted as discussed in Example 1, that the can molding apparatus depicted in FIG. 10 produced flawed can bottoms which would interfere or which could interfere with the oxygen permeability measurements. Accordingly, to compensate for the flawed bottoms of the containers the oxygen permeability of the whole container was determined first as to each individual container. After a steady state was reached, the bottoms were epoxied and a new steady state transmission rate was recorded. This was undertaken to illustrate the effects of the flawed bottoms on the oxygen transmission data for these lamellar transfer molded containers.

a. The Effect of the Number of Layers in the Stream to be Molded into a Desired Configuration In order to evaluate the effect of barrier layer thickness on the oxygen transmission rate of the containers as a whole, the number of barrier layers and the total number of layers in the second composite stream was varied over a broad range by adding or removing ISG's of the type shown in FIG. 3 and Ross ISG's.

Table 1 summarizes the results of varying barrier layer thickness on the oxygen permeability of the 32 mil thick sidewall containers. The data indicate a minimum in oxygen permeability when the number of layers in the second composite stream are within the range of 50 to 300. With relatively few layers in the stream, i.e., less than 50, the thicker barrier layers do not extend sufficiently in the mold cavity during the mold fill step to obtain adequate coverage along the entire length or cross-section of a container wall. With a large number of layers, the barrier layers are too thin and tend to become discontinuous. This has been confirmed by photomicrographs corresponding to having 1025 layers in the second composite stream, as compared to cross-sectional photomicrographs of articles molded from a second composite stream having 257 total layers. The tendency of the layers to become discontinuous causes the barrier performance of the container as a whole to eventually approach that of a conventional melt blend.

TABLE 1

Effect of Number of Layers in Stream to Be Molded on Oxygen Transmission Rate of 32 Mil Wall Containers

| Number of Barrier Layers | Total Number of Layers | Oxygen Transmission Rate (cc/day atm. pkg) | |
|---|---|---|---|
| | | Whole Container | Bottom Epoxied |
| 8 | 33 | 0.0075 | 0.0066 |
| 16 | 65 | 0.0106 | 0.0050 |
| 32 | 129 | 0.0068 | 0.0038 |
| 64 | 257 | 0.0059 | 0.0046 |
| 128 | 513 | 0.0166 | 0.0078 |
| 256 | 1025 | 0.0256 | 0.0238 |
| 512 | 2049 | 0.0443 | 0.0386 |
| Melt Blend | — | 0.5280 | — |
| HDPE Control | — | 0.3651 | 0.3060 |

The minimum in oxygen permeability in the 50 to 300 total layers range in the second composite stream amounts to approximately an 80-fold improvement in barrier performance as compared to an identically composed melt blend. The barrier level achieved in the containers of this example is equivalent to an oxygen ingression rate of less than 1.4 cubic centimeters in 12 months, which meets the shelf life requirements for a great many food products. This barrier level is attributed to the development of substantially continuous layers in both the axial and hoop directions in the can walls.

The oxygen permeability results as a function of the number of layers in the second composite stream for 42 mil thick sidewall containers are summarized in Table 2. The results indicate essentially the same trend in the dependence of the oxygen transmission rate of the cans on the number of layers in the second composite stream. In the 42 mil thick sidewall containers, below about 800 layers in the second composite stream, the barrier performance of the lamellar injection molded containers approaches that of a coextruded sheet with a perfectly uniform and continuous barrier layer in the structure.

TABLE 2

Effect of Number of Layers in the Stream to be Molded on Barrier Performance of 42 mil Wall Containers, HDPE/Plexar 2581/Soarnol D

| Number of Barrier Layers | Total Number of Layers | Oxygen Transmission Rate (cc/day. atm. pkg) | |
|---|---|---|---|
| | | Whole Container | Bottom Epoxied |
| 16 | 65 | 0.0003 | 0.0003 |
| 64 | 257 | 0.0007 | 0.0004 |
| 256 | 1025 | 0.0012 | — |
| 1024 | 4097 | 0.0163 | 0.0096 |
| 16384 | 65537 | 0.0640 | 0.0508 |
| Melt Blend | — | 0.2755 | 0.2455 |

The barrier level of about 0.001 cubic centimeters per day per atmosphere per package achieved with these containers, which is the lowest barrier level which can be reliably reported given the measurement techniques used, is equivalent to an oxygen ingression rate of less than 1 cubic centimeter in a two year time period, which exceeds the shelf life requirements for even high acid food products.

b. The Effect of the Amount of EVOH Barrier Material in the Structure

Table 3 summarizes the oxygen permeability data for lamellar molded 42 mil thick sidewall cans with a varying amount of the EVOH barrier material incorporated within the containers. The total number of layers in the second composite stream which was molded was kept the same in each case at a total of 257 layers. The results indicate that at least 10 percent by weight of the particular EVOH material used is the minimum amount required to achieve the barrier levels of 0.001 cubic centimeters per day per atmosphere per package which were noted in Table 2.

TABLE 3

Effect of Amount of EVOH in Structure in Performance of 42 Mil Wall Containers, 257 layers total HDPE/Plexar 2581/Soarnol D

| Amount of Soarnol D, wt. % | Oxygen Transmission Rate (cc/day. atm. pkg) | |
|---|---|---|
| | Whole Container | Bottom Epoxied |
| 5 | 0.0062 | — |
| 10 | 0.0008 | 0.0005 |
| 15 | 0.0003 | — | c. The Effect of the Amount of Plexar 2581™ Compatibilizing Material

Oxygen permeability measurements on containers having 257 total layers in the second composite stream and with 15 percent or 25 percent by weight of the Plexar 2581™ compatibilizing material showed no significant difference between the containers so constructed.

Given that a significant use of barrier resins is in food packaging and packaging materials, and given also that many consumers may prefer a pigmented or opaque packaging material, the effect on oxygen barrier performance of the addition of titanium dioxide pigment to 32 and 42 mil cans having 257 total layers was studied. The results show that the oxygen permeability characteristics of the 42 mil cans was not significantly affected by the addition of titanium dioxide while the 32 mil cans exhibited a noticeable loss of barrier due to larger titanium dioxide particles bursting through the thin layers of EVOH, creating a pin hole effect in the layers of barrier resin.

B. Xylene Permeation Characteristics

Many of the factors which were tested with regard to the oxygen permeability of cans molded from the high density polyethylene/Plexar/Soarnol D system were considered with regard to xylene permeation characteristics also, with the effect of the total number of layers on the xylene permeability of 32 mil can containers being summarized in Table 4. The data indicate a minimum in xylene permeability in the range of from about 50 to about 300 total layers in the second composite stream, which is similar to what was noted in the case of oxygen permeability. This minimum amounts to approximately a 160-fold improvement in barrier performance to xylene compared with a 32 mil high density polyethylene can. The melt blend apparently exhibits no real improvement over the high density polyethylene control. The barrier level which is achieved in the 32 mil cans is equivalent to a xylene weight loss of less than 0.01 percent in 12 months. By comparison, there was virtually no loss of xylene to the atmosphere in a 20 day period from a 42 mil high density polyethylene/Soarnol D™ can.

TABLE 4

Effect of Number of Layers in Stream to be Molded on Xylene Permeation Rate of HDPE/Soarnol D 32 Mil Wall Containers

| No. of Barrier Layers | Total No. of Layers | Wt Loss of Xylene mg/hr |
| --- | --- | --- |
| 8 | 33 | 0.657 |
| 16 | 65 | 0.371 |
| 32 | 129 | 0.201 |
| 64 | 257 | 0.363 |
| 128 | 513 | 0.461 |
| 256 | 1025 | 1.811 |
| 512 | 2049 | 2.791 |
| Melt Blend | — | 36.571 |
| HDPE Control | — | 32.600 |

The addition of titanium dioxide pigment had a negligible effect on xylene permeability in this system for 42 mil thick cans molded from a second composite stream having 257 total layers.

C. Environmental Stress Crack Resistance

The cans which were tested showed no evidence of failure even after 240 hours at room temperature. Typically an acceptable environmental stress crack resistance for cans made from polyethylene, for example, is 120 hours, which suggests that the lamellar-molded containers exhibit superior environmental stress crack resistance properties.

EXAMPLE 6

In this example multilayer cans were molded as in Example 5, but with a resin system including high density polyethylene having a melt index of 0.7 grams per 10 minutes and a density of 0.96 grams per cubic centimeter as the first material, Selar® PA3426 amorphous nylon having a reported density of 1.19 grams per cubic centimeter, and commercially available from E. I. du Pont De Nemours and Company Inc. Wilmington, Del., as the second material, and the assignee's Primacor® 1410 coextrudable tie layer resin, having a melt index of 1.5 grams per 10 minutes and a density of 0.938 grams per cubic centimeter, as the third material.

The cans which resulted were subjected to xylene and oxygen barrier tests which are described in detail in Example 5. The xylene permeability results are summarized in Table 5, and show that the high density polyethylene/nylon/Primacor® 42 mil molded containers exhibit over a fifty-fold improvement in xylene permeability over a 42 mil high density polyethylene can at ambient temperatures. This improvement appears to be comparable with the permeability figures reported in U.S. Pat. Nos. 4,410,482 to Subramanian, 4,416,942 to DiLuccio, and 4,444,817 to Subramanian for articles made by an extrusion blow molding process.

TABLE 5

Xylene Permeability of HDPE/Amorphous Nylon Containers

| Structure | Avg. Weight Loss of Xylene mg/hr | %/hr |
| --- | --- | --- |
| HDPE | 32.031 | 0.0109 |
| HDPE (71% by volume)/Primacor 1410 (13%)/Selar PA 3426 (16%) | 0.607 | 0.0007 |

*256 barrier layers (1025 total layers)

The oxygen permeability characteristics of the 42 mil thick molded cans of this example are shown in Table 6. An eight-fold improvement in oxygen barrier performance over cans molded from high density polyethylene alone is evident. This figure is also similar to the modest improvement in oxygen barrier achieved with a high density polyethylene/Selar® RB nylon laminar mixing process, as reported in the literature. See Subramanian, "Permeability Barriers by Controlled Morphology of Polymer Blends," Polymer Engineering Science, Volume 25, No. 8, Mid June 1985.

TABLE 6

Oxygen Barrier Performance of HDPE/Amorphous Nylon Containers

| Structure | Oxygen Transmission Rate (cc/day. atm. package) | |
| --- | --- | --- |
| | Whole Container | Bottom Epoxied |
| HDPE | — | 0.1980 |
| HDPE (71% by volume)/Primacor 1410 (13%)/Selar PA 3426 (16%) | 0.356 | 0.0254 |

*256 barrier layers (1025 total layers)

EXAMPLE 7

This example used the apparatus and method of Examples 1 and 2 in exploring a system having polypropylene as the structural component, rather than the HDPE previously studied, with the same EVOH as used in previous examples. Cans were molded in the 32 mil and 42 mil wall thicknesses according to the procedures set forth in Example 1, and the barriers of these containers to oxygen and xylene were studied as a function of several variables.

With regard to oxygen barrier, the effects of the amount of EVOH barrier resin in the structure, and of the particular compatibilizing material used were studied.

a. Effect of Amount of EVOH Barrier Resin

Cans of the 42 mil wall thickness were molded for this test using a polypropylene characterized by a melt flow index of 12 and a density of 0.903 grams per cubic centimeter as a first material, Soarnol D® EVOH as a second material, and Admer QF-500 tie layer resin from Mitsui Petrochemicals Industries, Ltd. (an anhydride-grafted polypropylene with a melt flow rate (MFR) of 3 grams per 10 minutes and a density of 0.91 grams per cubic centimeter) as the third material at 25 percent by weight throughout.

The results of oxygen permeability testing conducted as in previous examples for the effect of various amounts of the EVOH barrier resin are shown in Table 7, and correspond to a barrier efficiency of about 50% relative to an ideally coextruded 1025 layer coextruded sheet. The lower barriers achieved were believed indicative of substantial layer break-up and discontinuities in the molded can walls. Scanning electron microscopy of sidewall cross-sections near the bottom, middle and top of the can in both the axial and hoop directions confirmed that such layer breakup was indeed present.

TABLE 7

Effect of Amount of EVOH in Structure
on Barrier Performance of PP/EVOH Containers

| Amount of EVOH, Wt Percent | Oxygen Transmission Rate (cc/day. atm. package) | |
| --- | --- | --- |
| | Whole Container | Bottom Epoxied |
| 10 | 0.0117 | 0.0100 |
| 15 | 0.0067 | 0.0022 |
| 20 | — | 0.0025 |

*256 barrier layers (1025 total layers) PP and 25 wt % Admer QF500 tie layer resin b. Effect Of Compatibilizing Material Though the Admer QF-500® tie layer resin exhibited strong interfacial adhesion in preliminary testing with the EVOH and polypropylene materials selected, with peel strengths in five-layer coextruded sheets of 5.2 pounds per inch and 7.5 pounds per inch in the machine and transfer directions, respectively, at the 5 percent level by weight, the molded cans delaminated easily with but a gentle squeeze or in some cases only with the air ejection of the cans from the mold.

In an attempt to explore ways to improve the adhesion between the polypropylene and EVOH layers, other compatibilizing materials were evaluated. These were Admer QF-551 tie layer material from Mitsui (an anhydride-grafted polypropylene with an MFR of 5.7 and a density of 0.89) and Kraton® FG-1901X compatibilizing material from Shell Chemical Company, Houston, Tex. (a functionalized triblock SEBS copolymer of a density of 0.91 grams per cubic centimeter). A comparison of oxygen permeation data for cans molded using the original Admer® QF-500 and the Kraton® FG-1901X materials shows the Admer® QF-500 tie layer material to be superior (see Table 8). In a comparison between the Admer® QF-500 and Admer® QF-551 tie layer resins, the latter resulted in better looking cans but no significant improvement in barrier or adhesion was observed.

It was also thought that increasing the melt temperature of the charged composite stream might increase the flow of the Admer® QF-500 compatibilizing material and improve adhesion. Increasing the temperature of the charged composite stream from 440° F.–475° F. showed no improvement in adhesion or barrier performance, however.

TABLE 8

Effect of Compatibilizing Material in Structure
on Barrier Performance of 42 Mil PP/EVOH Containers

| Compatibilizing Material | Oxygen Transmission Rate (cc/day. atm. package) | |
| --- | --- | --- |
| | Whole Container | Bottom Epoxied |
| Admer ™ QF500 | 0.0021 | 0.0017 |
| Kraton ™ G1901X | 0.0351 | 0.0272 |

*64 barrier layers (257 total layers) 65% PP and 10 wt % Soarnol ™ D EVOH

Some testing was also done of the containers and of the various materials and amounts thereof for xylene permeation resistance. The use of 10 percent Soarnol D® EVOH resulted in a one hundred seventy-two-fold improvement in xylene permeation resistance over a polypropylene control. An additional 5 percent by weight of the Soarnol D® EVOH brought the improvement to nearly a thousand-fold. (See Table 9)

TABLE 9

Effect of Amount of EVOH in Structure on
Xylene Permeation of PP/EVOH Containers

| Amount of SOARNOL ™ D EVOH (wt %) | Avg. Wt. Loss of Xylene mg/hr |
| --- | --- |
| 0 | 122.37 |
| 10 | 0.709 |
| 15 | 0.127 |
| 20 | 0.027 |

*64 barrier layers (257 total layers) PP and 25 wt % Admer ™ QF500 compatibilizing material Where the barrier resin used was Eval® F resin, the xylene permeation rate through 32 mil thick wall containers molded from a 257 layer composite stream corresponded to 1.287 milligrams per hour of xylene weight loss. This figure represents nearly a hundred-fold improvement in xylene barrier over a polypropylene control, as compared to a one hundred seventy-two-fold improvement with 10 percent Soarnol D® EVOH.

EXAMPLE 8

In this example and in Examples 9 and 10, the effects of a lamellar construction are explored in terms of the environmental stress crack resistance(ESCR), deflection temperature under load(DTUL), and heat sag of various structural systems. In this and subsequent examples where performed, the environmental stress crack resistance for a test specimen was determined according to ASTM D1693 with synthetic gasoline (75 weight percent isooctane and 25 weight percent toluene) at 2000 psi constant applied stress. The distortion temperature under load for unannealed and annealed specimens was determined according to ASTM D648, and the heat sag after a specimen had been exposed to a temperature of 250 degrees Fahrenheit for a period of an hour.

This example looks primarily at systems of polycarbonate/polybutylene terephthalate (PBT) which are comprised of 15 parts and 30 parts of Celanex® 2002 PBT from Hoechst Celanese with the remaining 85 and 70 parts, respectively, comprising the assignee's Calibre® 300-10 polycarbonate. The Celanex™ 2002 material possessed a reported density of 1.31 grams per cubic centimeter with no melt index provided by the manufacturer, while the assignee's polycarbonate material had a melt index of 10 grams per 10 minutes and a density of 1.2 grams per cubic centimeter.

Test specimens were for one set of tests molded using the same equipment, except for the substitution of a four cavity test specimen mold as detailed earlier, and according to the same general procedures used in previous Examples from layered composite streams having 33, 65, 129, 257, 513 and 1,025 total layers, and from a melt blend both by transfer and injection molding. Test results from the first set of tests for the basic 85/15 system are reported in Table 10, while the results for the basic 70/30 system are shown in Table 11. The results obtained for a polycarbonate/toughened PBT system are provided in Table 12. Based on additional tests conducted to determine the effect of a lamellar construction on other structural properties, no loss in other structural properties was seen for any of the specimens thus made and otherwise tested compared to specimens formed from a melt blend of the same materials.

TABLE 10

Lamellar Molded PC/PBT (85/15) Specimens
Effect of Number of Layers in Stream to be Molded

| No. of Layers | ESCR (min.) | DTUL Unannealed/Annealed (°C./°C.) @ 66 psi | DTUL Unannealed/Annealed (°C./°C.) @ 264 psi | Heat Sag (mm) |
|---|---|---|---|---|
| 33 | 94.3 ± 42.9 | 140.4/151.6 | 118.1/149.4 | 1.8 ± 1.4 |
| 65 | 81.3 ± 12.3 | 140.5/150.1 | 125.0/147.6 | 3.4 ± 0.3 |
| 129 | 51.0 ± 4.6 | 137.8/148.0 | 120.2/146.0 | 2.5 ± 0.3 |
| 257 | 68.3 ± 8.1 | 135.3/150.6 | 121.8/146.4 | 2.5 ± 1.1 |
| 513 | 64.0 ± 10.5 | 135.6/146.5 | 116.6/142.0 | 2.7 ± 1.1 |
| 1025 | 52.0 ± 4.6 | 133.0/145.7 | 116.5/140.8 | 3.2 ± 1.3 |
| Melt Blend, Injection Molded | 15.0 ± 0.1 | | | |
| Melt Blend, Transfer Molded | 14.7 ± 2.1 | 116.5/125 | 104.9/120.0 | 34.7± |

TABLE 11

Lamellar Molded PC/PBT (70/30) Specimens
Effect of Number of Layers in Stream to be Molded

| No. of Layers | ESCR (min.) | DTUL Unannealed/Annealed (°C./°C.) @ 66 psi | DTUL Unannealed/Annealed (°C./°C.) @ 264 psi | Heat Sag (mm) |
|---|---|---|---|---|
| 33 | 203.7 ± 22.5 | 139.1/151.6 | 119.2/149.3 | 3.4 ± 0.7 |
| 65 | 193.5 ± 20.5 | 138.7/149.5 | 118.2/147.0 | 5.5 ± 0.9 |
| 129 | 167.7 ± 36.2 | 136.8/147.6 | 116.0/143.7 | 3.9 ± 0.3 |
| 257 | 198.7 ± 22.0 | 133.7/150.2 | 109.5/145.3 | 3.8 ± 1.7 |
| 513 | 210.3 ± 101 | 133.4/146.1 | 120.2/141.8 | 2.8 ± 1.0 |
| 1025 | 153.5 ± 27.6 | 133.2/144.7 | 111.6/139.5 | 3.5 ± 0.4 |
| Melt Blend, Transfer Molded | 176.0 ± 58.0 | 116.9/125.4 | 101.2/120.2 | 33.1 ± 0.1 |

TABLE 12

Lamellar Molded PC/PBT (85/15) (Toughened) Specimens.
Effect of Number of Layers in Stream to be Molded

| No. of Layers | DTUL Unannealed/Annealed (°C./°C.) @ 66 psi | DTUL Unannealed/Annealed (°C./°C.) @ 264 psi |
|---|---|---|
| 65 | 135.4/148.2 | 116.0/144.8 |
| 257 | 133.0/147.3 | 120.0/143.2 |
| Melt Blend, Transfer Molded | 116.0/123.3 | 106.8/118.4 |
| Melt Blend, Injection Molded | 114.9/122.4 | 103.7/117.8 |

Test specimens were also prepared on the same equipment and having the same number of layers but at three different proportions of the materials to examine the effect of composition changes on the DTUL and ESCR of the specimens. The results from these tests are reported in Table 13, and again, no loss in other structural properties was seen for specimens made and tested as indicated.

TABLE 13

Effect of Composition (129 layers)

| Amount of PBT (wt %) | ESCR (min.) | DTUL Unannealed/Annealed (°C./°C.) @ 66 psi | DTUL Unannealed/Annealed (°C./°C.) @ 264 psi | Heat Sag (mm) |
|---|---|---|---|---|
| 15 | 51.0 ± 4.6 | 137.8/148.0 | 120.2/146.0 | 2.5 ± 0.3 |
| 30 | 167.7 ± 36.2 | 136.8/147.6 | 116.0/143.7 | 3.9 ± 0.3 |
| 50 | >5700 | 133.9/146.6 | 102.0/140.4 | — |

EXAMPLE 9

This example looks at the benefits accruing from a lamellar construction in terms of the environmental stress crack resistance and deflection temperature under load of systems having 15 and 30 parts of Celanex® 2002 PBT by weight and 85 and 70 parts, respectively, of a 65 to 35 part polycarbonate/ABS blend, as a function of the total number of layers formed in the composite stream to be molded. The blend had a melt index of 3 grams per 10 minutes (230° C./3.8 kg) and a density of 1.12 grams per cubic centimeter, while the PBT had the properties ascribed to the Hoechst Celanese material previously. Test members were molded as in Example 8, with the same maintenance of other physical or structural properties seen in Example 8. The ESCR and DTUL results are reported in Tables 14 and 15 below, respectively, for the 85/15 and 70/30 systems.

TABLE 14

Effect of Number of Layers in Stream to be Molded-
PC/ABS Blend/PBT (85/15)

| No. of Layers | ESCR (min.) | DTUL Unannealed/Annealed (°C./°C.) @ 66 psi | DTUL Unannealed/Annealed (°C./°C.) @ 264 psi | Heat Sag (mm) |
|---|---|---|---|---|
| 33 | 56.7 ± 25.0 | 123.6/137.5 | 93.8/127.9 | 11.6 ± 0.7 |
| 65 | 86.3 ± 32.5 | 124.1/128.0 | 99.8/115.2 | 10.0 ± 1.1 |
| 129 | 58.7 ± 12.7 | 125.0/137.5 | 96.2/132.3 | 10.3± |
| 257 | 30.7 ± 8.3 | 122.8/135.9 | 95.3/124.3 | 21.9 ± 1.5 |
| 513 | 53.7 ± 6.4 | 120.2/132.5 | 92.9/122.2 | 16.7 ± 2.1 |
| 1025 | 34.0 ± 4.4 | 118.1/130.9 | 89.0/120.7 | 23.9 ± 1.0 |
| Melt Blend, Transfer Molded | 8.7 ± 0.6 | 96.1/105.6 | 86.6/102.1 | 125.6± |
| Melt Blend, Injection Molded | 12.0 ± 3.0 | 95/106 | 86/99 | — |

TABLE 15

Effect of Number of Layers in Stream to be Molded-
PC/ABS Blend/PBT (70/30)

| No. of Layers | ESCR (min.) | DTUL Unannealed/Annealed (°C./°C.) @ 66 psi | DTUL Unannealed/Annealed (°C./°C.) @ 264 psi | Heat Sag (mm) |
|---|---|---|---|---|
| 33 | 95.7 ± 24.0 | 123.3/137.6 | 96.1/130.1 | 8.3 ± 2.7 |
| 65 | 121.7 ± 23.4 | 124.7/137.3 | 97.1/129.2 | 7.8 ± 4.7 |
| 129 | 107.0 ± 8.7 | 123.9/136.4 | 98.3/128.6 | 11.0 ± 3.0 |
| 257 | 93.0 ± 31.0 | 119.1/131.9 | 92.2/120.0 | 15.2 ± 3.2 |
| 513 | 117.3 ± 22.8 | 118.1/131.2 | 87.3/122.4 | 12.6 ± 1.3 |

TABLE 15-continued

Effect of Number of Layers in Stream to be Molded-
PC/ABS Blend/PBT (70/30)

| No. of Layers | ESCR (min.) | DTUL Unannealed/Annealed (°C./°C.) @ 66 psi | @ 264 psi | Heat Sag (mm) |
|---|---|---|---|---|
| 1025 | 100.0 ± 14.9 | 113.3/128.4 | 86.0/115.7 | 16.4 ± 2.0 |
| Melt Blend, Transfer Molded | 64.0 ± 10.5 | 92.8/103.4 | 75.6/97.4 | 80.1 ± 1.4 |
| Melt Blend, Injection Molded | 13.7 ± 1.2 | 89/101 | 73/92 | — |

EXAMPLE 10

This example explores the environmental stress crack resistance and deflection temperature under load of test article s molded from composite streams having various numbers of layers of the assignee's Calibre® 300-10 polycarbonate (melt index of 10 grams per 10 minutes;density of 1.2 grams per cubic centimeter) and Traytuf® 1006-C polyethylene terephthalate (PET) from The Goodyear Tire and Rubber Company (melt index not reported, density of 1.37 grams per cubic centimeter), in systems comprising 30 parts PET with 70 parts polycarbonate by weight, and 15 parts PET with 85 parts polycarbonate by weight. The molding and testing procedures and equipment were those used in Examples 8 and 9 above. Test results are reported in Tables 16 and 17, and again no loss of other structural properties was observed compared to a melt blend of the materials in these systems.

TABLE 16

Effect of Number of Layers in Stream to be Molded-
PC/PET (85/15)

| No. of Layers | ESCR (min.) | DTUL Unannealed/Annealed (°C./°C.) @ 66 psi | @ 264 psi | Heat Sag (mm) |
|---|---|---|---|---|
| 65 | 24.3 ± 5.9 | 137.5/147.8 | 111.4/145.5 | 4.5 ± 0.4 |
| 129 | 24.3 ± 0.6 | 136.2/148.7 | 113.2/146.0 | 3.4 ± 0.6 |
| 257 | 25.0 ± 6.2 | 134.6/147.6 | 112.0/145.3 | 5.3 ± 1.2 |
| 513 | 25.0 ± 5.2 | 138.0/148.1 | 108.7/145.8 | 5.6 ± 0.4 |
| 1025 | 26.0 ± 3.5 | 137.5/148.2 | 109.6/145.6 | 4.8 ± 0.3 |
| Melt Blend, Transfer Molded | 11.3 ± 1.5 | 131.7/144.3 | 107.4/141.5 | 4.5 ± 0.3 |

TABLE 17

Effect of Number of Layers in Stream to be Molded-
PC/PET (70/30)

| No. of Layers | ESCR (min) | DTUL Unannealed/Annealed (°C./°C.) @ 66 psi | @ 264 psi | Heat Sag (mm) |
|---|---|---|---|---|
| 65 | 23.0 ± 2.0 | 133.4/147.4 | 97.8/144.6 | 6.0 ± 0.4 |

TABLE 17-continued

Effect of Number of Layers in Stream to be Molded-
PC/PET (70/30)

| No. of Layers | ESCR (min) | DTUL Unannealed/Annealed (°C./°C.) @ 66 psi | @ 264 psi | Heat Sag (mm) |
|---|---|---|---|---|
| 129 | 32.3 ± 5.1 | 135.5/148.5 | 100.3/145.9 | 4.2 ± 0.9 |
| 257 | 22.0 ± 1.7 | 136.2/147.8 | 97.5/145.5 | 7.0 ± 1.0 |
| 513 | 34.3 ± 1.5 | 135.7/148.7 | 101.4/146.6 | 5.5 ± 0.4 |
| 1025 | 26.0 ± 1.0 | 133.3/147.5 | 100.7/144.2 | 7.2 ± 0.8 |
| Melt Blend, Transfer Molded | 19.3 ± 4.0 | 125.4/142.6 | 97.2/139.7 | 5.8 ± 0.4 |

The foregoing examples demonstrate that the methods and apparatus of the present invention are well suited achieving the objects and realizing the advantages discussed previously herein, and specifically demonstrate that a lamellar construction could be achieved in moldable articles made by the methods and apparatus of the present invention for various combinations of materials, even where one of the materials may be present in only a relatively minor amount.

Large improvements in barrier to gases and solvents and in environmental stress crack resistance, and additional improvements in distortion temperature under load, are seen to result from such a lamellar construction compared to articles comprised of a melt blend of the same materials in the same proportions.

Similar improvements in filled systems with respect to the control of the coefficient of linear thermal expansion of an article, in the shielding of electromagnetic interference, and in ignition resistance should also be available by the lamellar constructions made possible by the present invention.

While preferred embodiments of the method, apparatus and articles of the present invention have been disclosed, numerous changes in these embodiments may be undertaken without departing in scope from the invention relating to these methods, apparatus and articles as defined by the claims which follow.

What is claimed is:

1. A method of making a blow molded multilayer plastic article, comprising the steps of:

providing first and second streams of first and second diverse thermoplastic resinous materials;

forming via a coextrusion feedblock device said streams into a plurality of layers of substantially uniform thickness;

arranging via said coextrusion feedblock device said layers in a first composite stream such that said composite stream has a substantially uniform distribution of said layers;

manipulating via an interfacial surface generator said first composite stream to form a second composite stream having an increased number of layers of substantially uniform thickness; and blow molding said second composite stream into a desired configuration having at least one critical surface such that a plurality of said layers of said first and second materials of said second composite stream lie generally parallel to said surface, and further such that at least about 90 percent of said layers of said first and second materials adjacent said critical surface are discrete and substantially continuous.

2. A method as set forth in claim 1, wherein said step of molding said second composite stream comprises the steps of providing a single piston, engaging said second composite stream with only said single piston, and forcing said second composite stream into a mold cavity via said single piston.

3. A method as set forth in claim 1, wherein said step of forming via a coextrusion feedblock device said streams into a plurality of layers of substantially uniform thickness comprises the step of forming each of said streams into three or more layers of substantially uniform thickness.

4. A method as defined in claim 1, further comprising the step of injecting said second composite stream into a mold cavity and said blow molding step comprises the step of blow molding said injected second composite stream into said desired configuration.

5. A method of making a blow molded multilayer plastic article, comprising the steps of:
 providing first and second streams of first and second diverse thermoplastic resinous materials;
 forming via a coextrusion feedblock device said streams into a plurality of layers of substantially uniform thickness,
 arranging via said coextrusion feedblock device said layers in a first composite stream such that said composite stream has a substantially uniform distribution of said layers;
 manipulating via an interfacial surface generator said first composite stream to form a second composite stream having an increased number of layers of substantially uniform thickness; and
 blow molding said second composite stream into a desired configuration having at least one critical surface such that a plurality of said layers of said first and second materials of said second composite stream lie generally parallel to said surface and said second composite stream in said desired configuration possesses a substantial uniformity of composition with respect to at least said layers of said first and second materials adjacent said critical surface.

6. A method as defined in claim 5, further comprising the step of injecting said second composite stream into a mold cavity and said blow molding step comprises the step of blow molding said injected second composite stream into said desired configuration.

7. A method of making a blow molded multilayer plastic article, comprising the steps of:
 providing first and second streams of first and second diverse thermoplastic resinous materials;
 providing a stream of a third material;
 forming via a coextrusion feedblock device each of said streams into a plurality layers of substantially uniform thickness;
 arranging via said coextrusion feedblock device said layers in a selected layer order in a first composite stream such that said composite stream has a substantially uniform distribution of said layers;
 manipulating via an interfacial surface generator said first composite stream to form a second composite stream having an increased number of layers of substantially uniform thickness, and
 blow molding said second composite stream into a desired configuration having at least one critical surface such that a plurality of said layers of said first, second and third materials of said second composite stream lie generally parallel to said surface and at least about 90 percent of said layers of said first, second and third materials adjacent said critical surface are discrete and substantially continuous.

8. A method as defined in claim 7, further comprising the step of injecting said second composite stream into a mold cavity and said blow molding step comprises the step of blow molding said injected second composite stream into said desired configuration.

9. A method of making a blow molded multilayer plastic article, comprising the steps of:
 providing first and second streams of first and second diverse thermoplastic resinous materials;
 forming via a coextrusion feedblock device said streams into more than one layer of substantially uniform thickness;
 arranging via said coextrusion feedblock device said layers in a first composite stream such that said composite stream has a substantially uniform distribution of said layers;
 manipulating via an interfacial surface generator said first composite stream to form a second composite stream having an increased number of layers of substantially uniform thickness; and
 blow molding said second composite stream into a desired configuration having at least one critical surface such that a plurality of said layers of said first and second materials of said second composite stream lie generally parallel to said surface, and further such that at least about 90 percent of said layers of said first and second materials adjacent said critical surface are discrete and substantially continuous.

* * * * *